(12) United States Patent
Rothschild et al.

(10) Patent No.: US 6,879,981 B2
(45) Date of Patent: Apr. 12, 2005

(54) SHARING LIVE DATA WITH A NON COOPERATIVE DBMS

(75) Inventors: Michael Rothschild, Ramot Hashavim (IL); Tsvi Misinai, Rochovot (IL)

(73) Assignee: Corigin Ltd., Or-Yehuda (IL)

( * ) Notice: Subject to any disclaimer, the term of this patent is extended or adjusted under 35 U.S.C. 154(b) by 437 days.

(21) Appl. No.: 10/042,941

(22) Filed: Jan. 9, 2002

(65) Prior Publication Data

US 2002/0103804 A1 Aug. 1, 2002

Related U.S. Application Data

(60) Provisional application No. 60/260,521, filed on Jan. 16, 2001.

(51) Int. Cl.[7] .......................... G06F 17/00; G06F 3/00; G06F 12/00
(52) U.S. Cl. ................. 707/8; 711/3; 710/18
(58) Field of Search .............. 707/1, 7–9, 100; 711/3, 100, 113, 129–130; 710/1, 17–18, 36, 200, 220

(56) References Cited

U.S. PATENT DOCUMENTS 5,625,815 A * 4/1997 Maier et al. ................. 707/8
6,212,520 B1 * 4/2001 Maruyama et al. ........... 707/10

* cited by examiner

*Primary Examiner*—Alford W. Kindred
(74) *Attorney, Agent, or Firm*—Herbert Dubno

(57) ABSTRACT

The log file maintained by a DBMS is used, possibly in conjunction with hardware that listens to the communication between a computer and the storage controller to create cache buffers and a locking mechanism that enable applications running on one computer system to consistently access the data maintained and updated by a different computer.

19 Claims, 15 Drawing Sheets

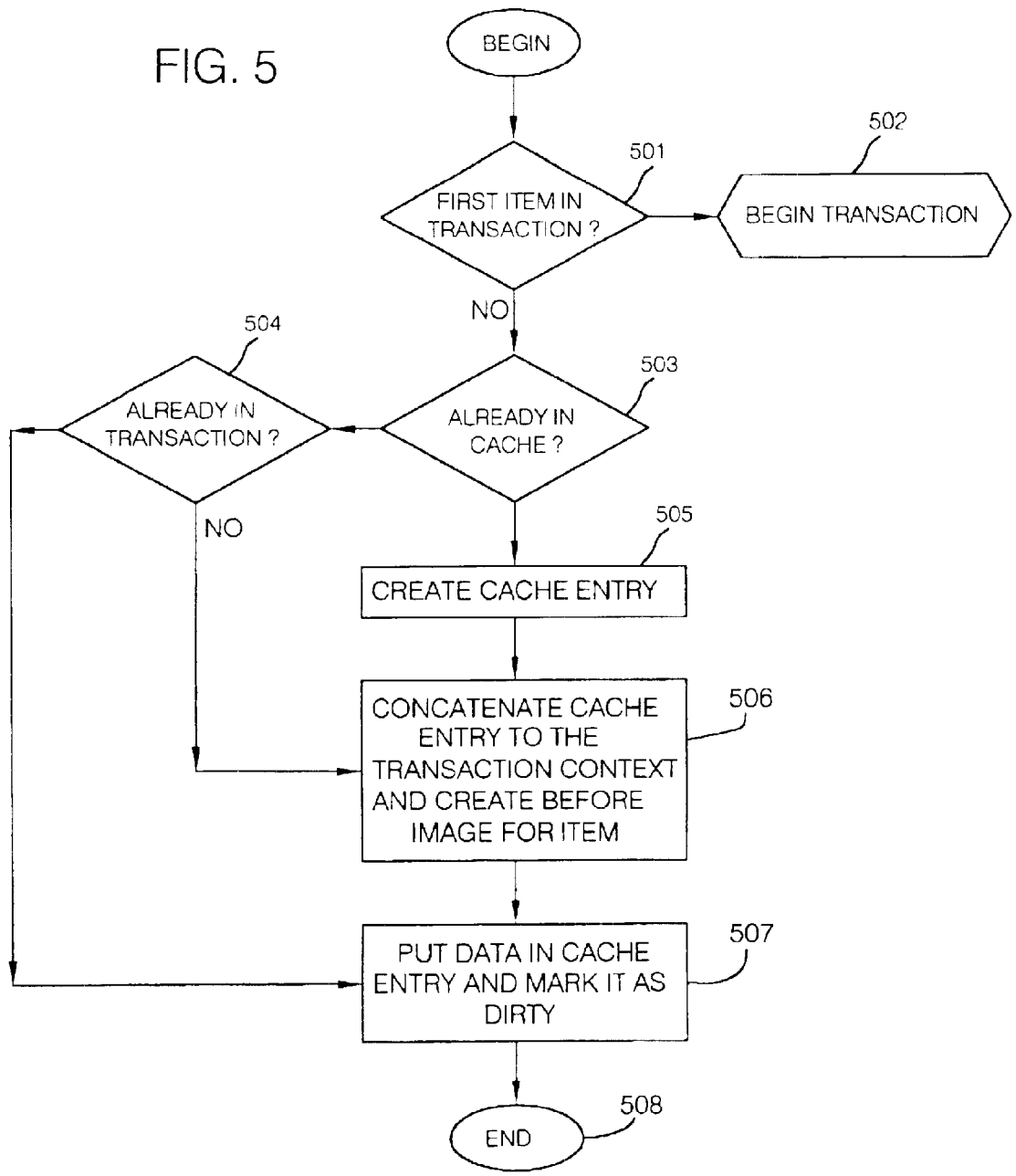

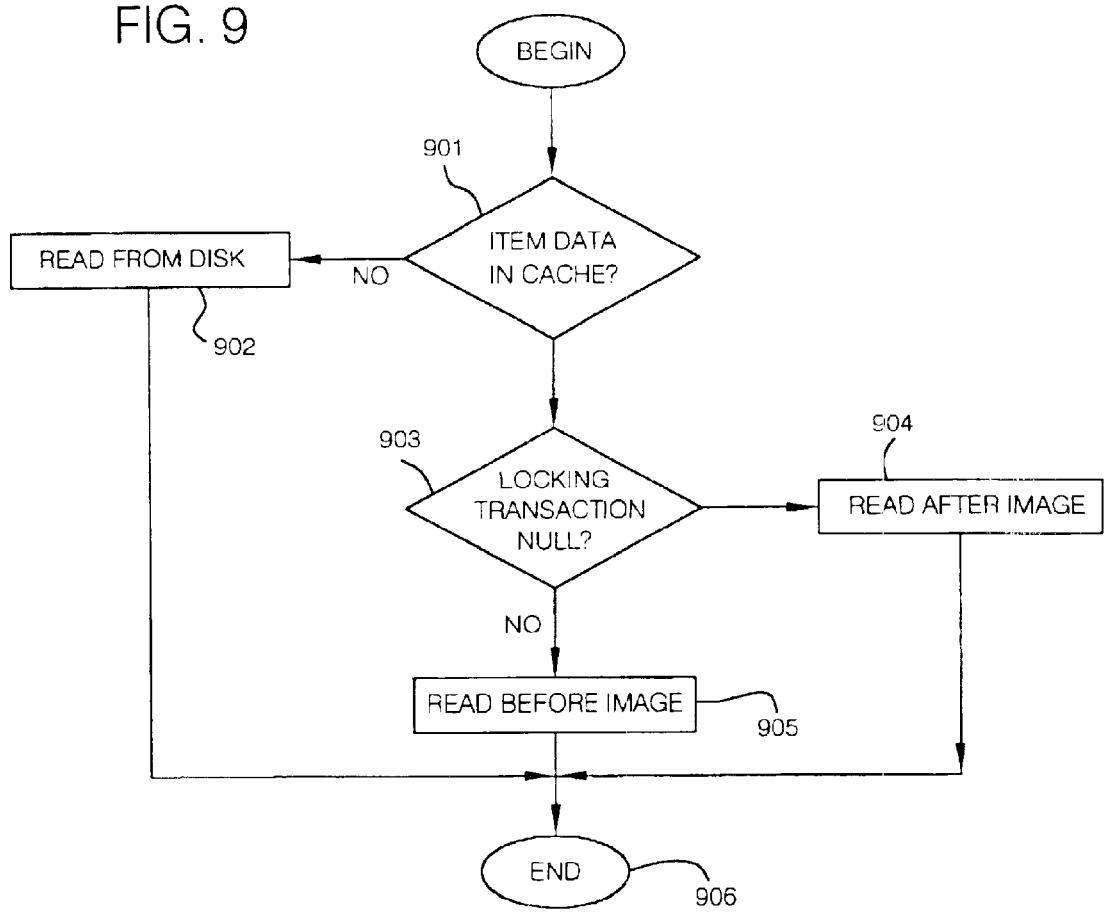

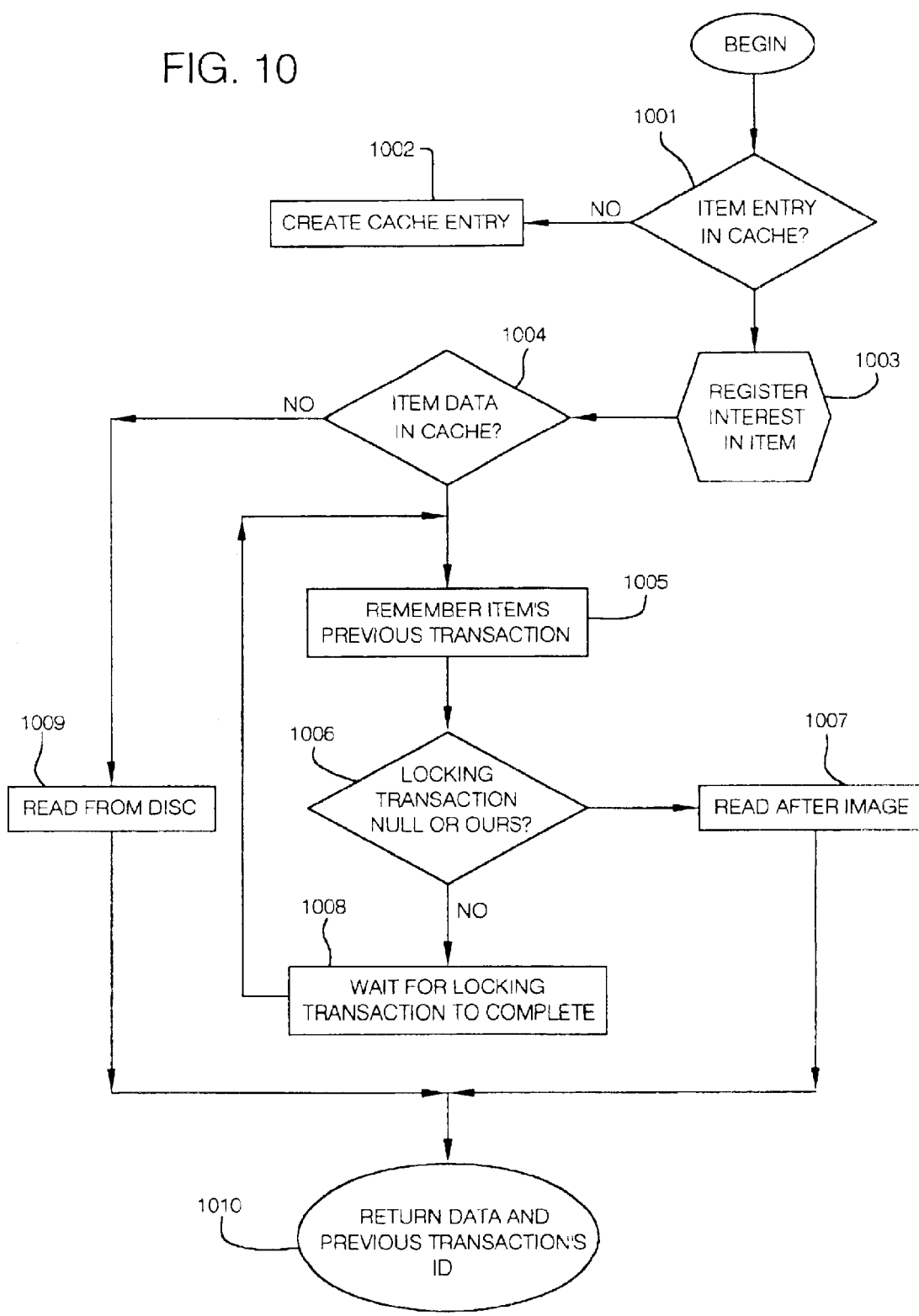

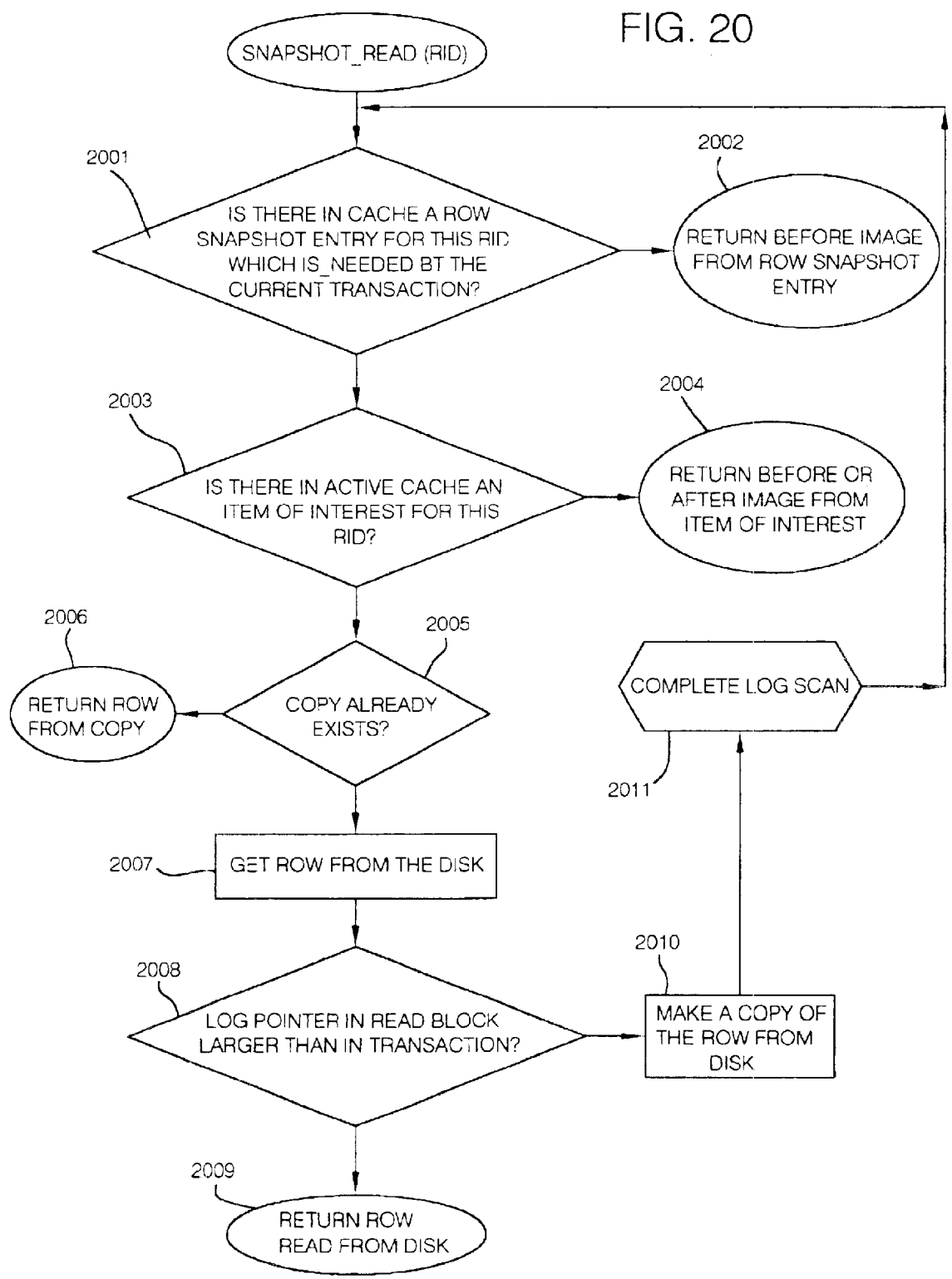

SHARING LIVE DATA WITH A NON COOPERATIVE DBMS

CROSS REFERENCE TO RELATED APPLICATION

This application is a nonprovisional application corresponding to the provisional application No. 60/260,521 filed Jan. 16, 2001.

FIELD OF THE INVENTION

This invention relates to the field of sharing data between possibly heterogeneous computer systems. More specifically, it deals with a way to enable one computer system to read the data of a DBMS server executing on another computer system directly from the disk. With the invention there is no need for said DBMS to be aware of the fact that the data is being accessed by a different computer system and make its cache buffers and locks available to that computer system.

BACKGROUND OF THE INVENTION

Most DBMSs use a locking mechanism within the computer system they are running in, to protect themselves and the applications using them against reading the data when in an inconsistent state. They also use cache buffers to improve performance, potentially deferring the actual manifestation of committed data on the disk for an indefinite time.

Accessing the live data maintained by such DBMSs in a consistent way is, hence, impossible for programs running on a different system.

Prior art tools, accessing data of a DBMS in a heterogeneous environment rely, therefore, on quiesced, stable, potentially mirrored, images of the data.

This results in the need for long periods where the database is not updated or for extra storage and the ability to compromise with data that is not up to date.

The purpose of the current invention, is to relief that restriction and create a mechanism that will enable access to the live data of a DBMS executing on a different system without relying on said DBMS's cache buffers and locking protocols or on cycles in the computer system where said DBMS is executing.

OBJECTS OF THE INVENTION

It is the object of the invention to provide an improved method of and system for sharing live data in a DBMS.

Another object of the invention is to provide an improved computer system for carrying out the method.

These objects and others which will become apparent hereinafter are attained, in accordance with the invention, by a method of sharing of live data with a non-cooperative or unaware DBMS using another or secondary DBMS. The method of the invention, therefore, utilizes a non-cooperative DBMS of a primary computer system which participates in unaware applications and has a cache, respective lock structures, database log files and database data files responsive to data requests generated by the unaware applications. The method of the invention comprises the steps of:

(a) nonintrusively monitoring data written to the database log files and the database data files and communicating information as to data written to the files to a secondary DBMS running on a potentially different computer and having a secondary cache and secondary lock requests and responsive to data requests by other unaware applications; and (b) processing data in the secondary DBMS between the other unaware applications and with the secondary cache and the secondary lock requests while reading data from the non-cooperative DBMS data files without interrupting update or retrieval activities of the non-cooperative DBMS and while isolating the non-cooperative DBMS from the other applications, thereby enabling the other unaware applications to access the data maintained by the non-cooperative DBMS.

The term "potentially different computer" is intended to recognize that, while the invention is usually practiced with a secondary computer system of which the secondary DBMS forms a part, it is theoretically possible to have the secondary DBMS for part of the primary computer system. Furthermore, the secondary DBMS can be housed in a hardware unit which forms a controller and having its own CPU, although that hardware unit may not be considered to be a secondary computer system as such.

Any computer system referred to herein may be a single computer or a plurality of computers which may or may not be connected in one or more networks.

The method of the invention can include the step of intercepting data written by the primary computer system to the non-cooperative DBMS and parsing the intercepted data nonintrusively with respect to the primary computer system with a listener and utilizing the parsed intercepted data to establish the secondary cache and secondary lock requests shielding the other unaware applications from inconsistent data of the primary computer system.

The secondary DBMS operates with items of interest having a structure consisting of a part defining an item type distinguishing between parts of a data base, a part defining an identity of the item in the database, a "dirty" part describing parts of an item not previously transferred to storage, a part describing a previous transaction involving the item to permit updating of that transaction, a part describing a locking transaction, a part facilitating application of an optimization algorithm, a list of pending reads identifying addresses which have shown interest in the item, a part representing a before image constituting a pointer to data represented by the item before the transaction, a part representing an after image of data subsequent to the transaction and a part representing a transaction initiated by a respective one of the other unaware applications.

Each transaction with an item of interest can be effected in the listener by the steps of:

(i) checking whether the item of interest is a first item of the transaction;

(ii) if the item of interest is the first item of the transaction, process the item of interest by exclusively locking the transaction identification of the item of interest and creating a transaction entry therefore;

(iii) if the item of interest is not the first item of the transaction or after the creation of the transaction entry, checking whether the item of interest is already in cache;

(iv) if the item of interest is not already in cache, creating a cache entry therefore;

(v) if the item of interest is already in cache, checking whether the item of interest belongs to a previous transaction;

(vi) if the item of interest is already in cache but does not belong to a previous transaction and following step (iv), concatenating the cache entry with a transaction context and createing the before image for the item of interest; and (vii) following step (vi) and, where the item of interest following step (v) belongs to a previous transaction, updating the cache entry to contain a new after image and "dirty" part.

Checking of an item of interest read by the listener in the past can be effected by the steps of:

(I) checking whether the item of interest is locked by a transaction;

(II) if the item of interest is not locked by a transaction, verify if the previous transaction for the item of interest is the same as the previous transaction for a prior reading by comparing the previous transaction part of the item of interest with a corresponding entry of the previous transaction at the prior reading; and (III) validating the item of interest when the previous transaction part is the same as the corresponding entry of the previous transaction at the prior reading.

The invention can include initiating at time intervals (predetermined time intervals or time intervals determined by an event or status) a postlistener sequence in the listener which comprises the steps of:

(A) scanning an item of interest cache entry;

(B) selecting entries of items of interest having NULL locking transaction parts;

(C) for each item of interest having a NULL locking transaction part, checking whether the item of interest entry has a "dirty" part;

(D) for each item of interest found to have a "dirty" part in step (C), reading corresponding data from storage and updating the "dirty" part data; and (E) following step (A) in the case of an cache entry of an item of interest having a not NULL locking transaction part, following step (C) for each cache entry having no "dirty" part and following step (D) for each cache entry having an updated "dirty" part, returning to step (A) to scan a next item of interest cache entry until all item of interest cache entries are scanned.

Update operations initiated in the secondary computer system are delegated to the non-cooperative DBMS by the steps of:

transmitting from the secondary DBMS to the non-cooperative DBMS of the primary computer system an update instruction based upon a read transaction of one of the other unaware applications;

checking whether the update of the non-cooperative DBMS of the primary computer system has been completed;

thereafter locking the transaction initiated by the one of the other unaware applications; and creating cache entries including after images for all items of interest affected by the update.

The method can include updating, with the secondary DBMS in response to one of the other unaware applications, the non-cooperative DBMS at least in part by delegating update operations and subsequent retrieval operations directly or indirectly to the non-cooperative DBMS.

The cache associated with the secondary DBMS can be provided with a storage capacity sufficient to hold the entire contents of the data of at least one of the DBMSs. With the present availability of low-cost high-capacity memory, the cache storage can be sufficient to hold the entire contents of each and even both databases.

The hardware unit of the invention can be a computer system or controller comprised of a secondary DBMS, a secondary cache and secondary lock structures and connectable for data sharing with a non-cooperative DBMS of a primary computer which participates in unaware applications and has a cache, respective lock structures, database log files and database data files responsive to data requests generated by the unaware applications, the computer system having a listener connected to the non-cooperative DBMS for:

(a) nonintrusively monitoring data written to the database log files and communicating information as to data written to the files to the secondary DBMS of the computer system, the computer system being responsive to data requests by other unaware applications; and (b) processing data in the secondary DBMS between the other unaware applications and with the secondary cache and the secondary lock requests while reading data from the non-cooperative DBMS with the secondary DBMS without interrupting update or retrieval activities of the non-cooperative DBMS and while isolating the non-cooperative DBMS from the other applications, thereby enabling the other unaware applications to access the data maintained by the non-cooperative DBMS.

The listener, the secondary DBMS and the secondary cache can be provided in a single hardware unit separately from a computer on which the other applications are run. Alternatively, the listener, the secondary DBMS and the secondary cache can be provided in a computer in which the other applications are run.

The listener can be connected to intercept data written by the primary computer to the non-cooperative DBMS and prgrammed to parse the intercepted data nonintrusively with respect to the primary computer and utilize the parsed intercepted data to establish the secondary cache and secondary lock requests shielding unaware applications executed in the computer system from inconsistent data of the primary computer.

The listener can be combined with a storage controller responsive to SQL select and other data manipulation read commands retrieving data of the non-cooperative DBMS. At least one of the computers can have a multiplicity of dedicated CPUs for executing the SQL select and other data manipulation read commands in parallel on different parts of the secondary cache. The method of the invention can include a method of supporting true repeatable read and serializeable transactions which comprises the steps of:

(a) during a repeatable read and serializeable transaction in a database management system, storing a transaction time for an entire duration of the transaction; and (b) automatically based on the transaction time stored in step (a) further processing the transaction to create an appearance that the transaction occurred at a single point in time.

BRIEF DESCRIPTION OF THE DRAWING

The above and other objects, features, and advantages will become more readily apparent from the following description, reference being made to the accompanying drawing in which:

FIG. 5 describes what we do when an Item of Interest is written to the log;

FIG. 9 shows how we implement an unprotected read;

FIG. 10 shows how we implement a protected read;

FIG. 20 describes the snapshot read function.

DESCRIPTION OF THE PREFERRED EMBODIMENT

Definitions and Notation

Non-Cooperative DBMS

Figure 1:
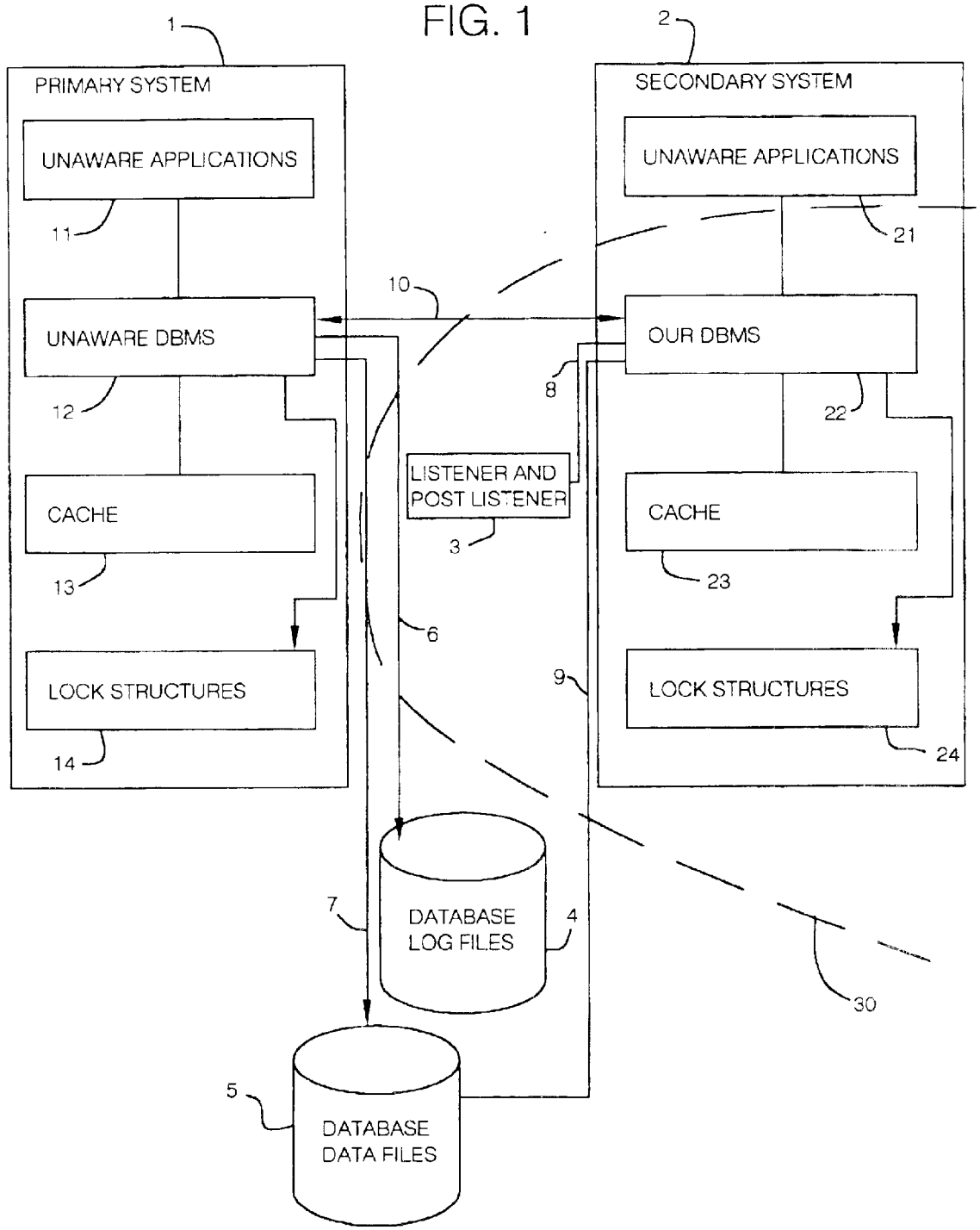
FIG. 1 is a bird's eye view of the system.

Any DBMS that has not been created with the explicit intention to share data with our DBMS is a non-cooperative DBMS.

Item of Interest

An item in the database that the unaware DBMS might, occasionally, lock or maintain a copy of in the cache. When in the cache, items of interest are represented by cache entries 100 described in FIG. 2.

Depending on the behavior of the unaware DBMS, items of interest may be selected to be index blocks, data blocks, table rows, column values, specific bytes in a data row etc. In many parts of the description below, we have assumed that items of interest have been selected to represent table rows. In all these parts, an arbitrary item of interest could have been used instead.

If, for example, the unaware DBMS is IBM's DB2 and the option "change data capture" is not active for a given table then entire data rows cannot serve as items of interest and we are bound to use smaller items of interest.

Dirty Part Information

The Dirty part information is a part of an item's description that describes which parts of the item's data have not yet been transferred to the disk. This description is required since the representation in the database, of an item of interest, may span more than one physical block and at any given moment, parts of the item's data may have already been written to the disk, while others are still waiting to be written.

Listener

A process capable of detecting and parsing I/O operations initiated by one computer and invoking pre-defined functions to deal with them. The listener is preferably based on a special feature in the hardware (e.g. in the storage controller, an exit in the primary computer, or any special purpose device) that physically senses the write operations performed by said one computer to the disk. In this case, the listener is aware of all write operations initiated by said one computer. It can, on the other hand, be implemented as a software only process that periodically scans the tail of the unaware DBMS's log to detect activity on the DBMS. In this case, information concerning I/O operations that are not directed to the log (needed for cache reclamation) is obtained by the post listener.

The hardware device capable of sensing the communication between the computer and the disk is not described here since prior art devices already do it for other purposes: the disk control unit senses what the computer sends to the disk and the computer senses what the disk control unit sends to the computer.

Post Listener

This process exists only when the listener is not based on a hardware that listens to all I/O operations to the disk.

Its purpose is to update the dirty part information 103 associated with items of interest entries 100 in the cache, enabling reclamation of the cache space that is no longer needed.

Interest Registration

A process that reads an item of interest could register interest in that item.

This will cause the cache entry for this item to be maintained for as long as the process is interested in it (i.e. until it unregisters interest in that item).

Structure Consistency

The data in the DBMS has a structure the DBMS is aware of, which usually consists of indices and data with some known physical representation.

A state of structure consistency is a state where all the data in the database and only that data can be reached by the search algorithms used by the DBMS.

Data Consistency

An application may rely on data dependencies of which the DBMS is not automatically aware.

These dependencies are always handled in the scope of transactions.

A state of data consistency is one where all the dependencies the application is aware of are honored.

Reading Process

We use this term when we refer to the part of our DBMS 22 that reads the data for the application. This does not mean that the read activity gets its own process. It may be so but it may also be a thread or a part of a more comprehensive process of our DBMS 22 or even a process of the unaware application 21. At any case, a reading process must have some kind of identification. It is this identification that we use in the elements of the list of pending reads 107 in FIG. 2.

Protected and Unprotected Reads

A reading process issues a protected read for an item of interest whenever it needs to be sure of the consistency of the data it obtains from this item with that of other items and this consistency is not insured by the logic of the specific unaware DBMS 12 that is being used.

The unaware DBMS 12, when in need of such a consistency will normally use locks to insure it but our DBMS 22 can not lock the unaware DBMS 12 and instead of locking the items it reads, it reads them through the protected read mechanism that enables it to detect whenever the consistency has been violated and restart the affected read sequence.

Unprotected reads are used when we know in advance, through our knowledge about the unaware DBMS's operation that the consistency we need will not be violated through any update it might perform to the data or in cases where we have a mechanism that overcomes the inconsistencies that may be encountered. For example, when we read a page from the low level of a DB2 index and we find in this page a key that conforms to our where-clause with a pointer to a row of the table. If we are able to deal with the situation where the pointed row has been deleted or updated in a manner that it no longer conforms to our where-clause then we do not need a protected read to insure the consistency between the row and the index.

Disk

We use the term disk to represent any kind of secondary storage device or device controller.

Transaction ID

An ID that enables us to identify a transaction and find all the update operations performed in its context in the log. In many DBMSs the position on the log (the relative byte address) of the first record written in the context of a transaction, can be used as its ID.

Whenever we talk about identifying a transaction, remembering a transaction, or doing anything to a transaction, we use the transaction ID. This is also true for structure descriptions; a column named previous transaction will contain the ID of the previous transaction.

Update Operations

Wherever we talk about update operations our DBMS 22 detects and delegates to the unaware DBMS 12, it should be understood that this term is also meant to describe read operations that are expected to lock the items they retrieve from being updated, for the duration of the transaction or part of it.

Reclaiming Cache

The cache is normally a part of the main storage and, as such, it is limited in size.

Proper measures should be taken to ensure that, whenever an item is to be inserted into the cache, the unused part in the cache is large enough to contain it.

The function "Reclaim cache" removes from the cache all the entries that are not needed.

Our DBMS 22 activates this function whenever there is not enough room in the cache for the insertion of an item that it should contain.

Our DBMS 22 can also activate this function on a regular basis, whenever a special timer expires or another housekeeping trigger is fired.

For clarity reasons, the process of checking the availability of cache memory and the invocation of the "Reclaim cache" function, have been omitted from most Figures. It should be understood, however, that whenever we put something in the cache, we always check whether or not the cache has enough free space to contain it, and, if it doesn't, we invoke the "Reclaim cache" function.

A more elaborate embodiment might put some of the cache on secondary storage thus reducing the need for frequent invocations of the "Reclaim cache" function.

Atomic Operation

An atomic operation is an operation that cannot be decomposed.

This is a relative term. An operation that one process sees as atomic, may be seen by another (normally the process that implements it) as a composition of simpler operations. From the perspective of a process that expects an operation to be atomic, however, nothing can happen during that operation. Every event the process is aware of happens, from its perspective, either before or after that operation.

Isolation Levels

The standard SQL-92 definition of "read uncommitted", "read committed", "repeatable read" and "serialisable" isolation levels.

Delegation of Activity to the Unaware DBMS

Whenever, in the preferred embodiment we say we delegate an operation to the unaware DBMS it should be understood that we also mean to refer to the cases where this delegation is indirect (i.e. the direct delegation is to an application, in the secondary or primary computer system that, in its turn further delegates the operation, directly or indirectly to the unaware DBMS).

To support an indirect delegation, a mechanism should be created that detects the operations that should be delegated and reformulates these operations to the terms understood by the intermediate application.

Detailed Description

FIG. 1 contains a top-level description of the system and its workings.

On the left of the Figure we see the primary system 1 on which the unaware applications 11 and the unaware DBMS 12 are executing. This system is not part of the contribution of the current invention and neither are the Database log files 4 and Database data files 5. They are supposed to exist, however, wherever this invention is implemented. The primary system 1 contains, potentially, more than one computer, there are, potentially, more than one instance of an unaware application 11 and even the unaware DBMS 12 may comprise a plurality of cooperating processes. Relevant parts of the cache 13 can be replicated in more than one computer and a central copy of the cache can be maintained in one computer or in a special device like IBM's coupling facility. The same goes for the lock structures.

In the normal mode of operation the unaware applications 11 send data requests to the unaware DBMS 12. To service these requests, the DBMS maintains the cache buffers 13, the lock structures 14, the database data files 5 and the database log files 4.

All the above components are termed "unaware" since they are not aware of the existence of any of the components this invention suggests. They continue to work as usual even when these components are added to the system, without any special contribution to their operation.

The first component that is special to this invention is the listener 3.

This process parses the data written by the primary system to the database log files 4 and, potentially, to the database data files 5, in a non-intrusive way, and communicates its findings to our DBMS 22.

Our DBMS 22 uses this information to create its own cache buffers 23 and lock structures 24 that shield the unaware applications 21 using our DBMS 22 from the otherwise inconsistent view of the database data contained in the database data files 5. The data returned from our DBMS 22 to the Unaware applications 21, in a response to a retrieval request, is a combination of the data it retrieves from the cache 23 and from the database data files 5. Access 9 of our DBMS 22 to the database data files 5 is drawn here as a simple arrow, as if it were a simple I/O operation. This is not necessarily so. Access 9 may rely on data sharing infrastructure like the one described in U.S. Pat. No. 5,758,125. Unaware applications 21 are also termed "unaware" since as far as they are concerned, they use our DBMS 22 to access the data in the database data files 5. They are usual DBMS applications, not aware of the complexities of this invention.

Whenever any of the unaware applications 21 asks our DBMS 22 to update the database data files 5, our DBMS 22 uses the communication lines 10 to delegate this request to the unaware DBMS 12. For the unaware DBMS 12, this request is just another request from one of its clients.

The dashed line 30 separates between the parts of FIG. 1 that are part of the current invention and the parts that this invention uses or is used by. This line goes through unaware application 21 since, although most of this application is not aware of the current invention, it still has to use the API of the DBMS 22 that is part of this invention.

Note that this Figure is an architectural diagram. It is not intended to imply any specific packaging of the various components.

Inter alia, there may be a plurality of unaware applications 21 residing on a plurality of secondary computer systems 2. Each of these unaware applications 21 may be using a component of our DBMS 22 residing on the same secondary computer system 2 it is running in or a component that runs on a separate secondary computer system 2. The cache 23 and the lock structures 24 may be replicated on a plurality of secondary computer systems 2 but they may be maintained in a central server as well.

Figure 2:
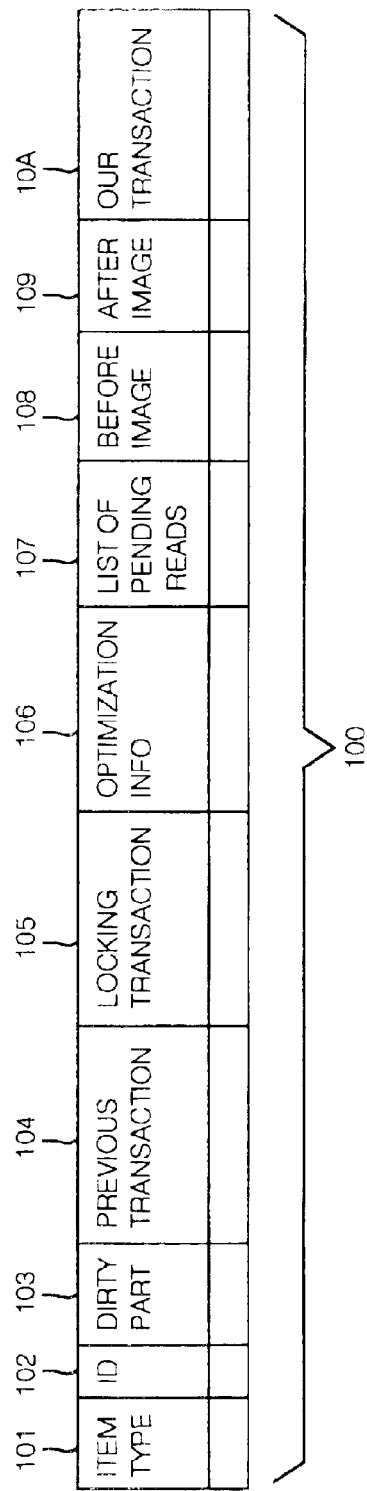
FIG. 2 depicts the structure describing an Item of Interest.

FIG. 2 depicts the structure 100 we use to describe an Item of interest.

There may be several types of items of interest (like data row or index page) and the item type column 101 is used to discriminate them.

Each item has an ID (like page ID or row ID) that determines its identity in the database. This same ID is used to identify the entry describing that item in the cache. It is stored in column 102.

An item entry 100 may be created to contain the data in the item (in cases where the data has not yet been transferred to the disk, but also in other cases, just for performance purposes) or to support a locking mechanism that protects the protected read operations from reading it when it is locked and keeps track of transactions that updated it after we read it.

The Dirty part column 103 describes which parts of the item's data have not yet been transferred to the disk. This description is required since an item of interest's representation in the database may span more than one physical block and at any given moment, parts of the item's data may have already been written to the disk, while others are still waiting to be written. When the dirty part is empty the item's after image 109 may be removed from the cache (but may also remain there to improve performance).

The locking transaction column 105, when not empty, contains the ID of the transaction that is currently locking the item exclusively.

The previous transaction column 104 enables processes that have read the item and relied on its contents, to detect cases when it has been updated after they read it but before they completed a series of reads including the read of this item that is expected to be atomic (like when an index block is updated to reflect a split of a block in a lower level, after we read it, but before we read the lower level block it points to).

This mechanism in which the reading process checks whether it should restart an atomic operation because the relevant data has changed during its execution is a design decision in this embodiment, but it is not a necessity. It could be replaced by a mechanism that interrupts the atomic operation in the reading process and notifies it, it should restart. This notification mechanism could rely on the list of pending reads 107 in order to know who should be notified since what we put in the elements of this list are the identifications of the reading processes that have registered interest in the item. In the preferred embodiment there is no such notification since the reading process checks for the need to restart synchronously. In this embodiment column 107 is there just to make sure that the garbage collection mechanism does not discard the Item of interest's entry 100 in the cache before a process that uses it had the chance to check its contents.

The optimization info column 106 has been added to support optimization related cache management that might decide which entry should be removed from the cache (between the entries having an empty dirty part 103, no locking transaction 105 and no pending reads 107) on the basis of an algorithm like Least Recently Used (LRU).

The before image column 108 contains a pointer to the data in the item before the current transaction has started. It has no meaning and it's space can be reclaimed at the moment a transaction completes and once it is created for an item, as a result of a transaction, it is not altered during the execution of that transaction.

The after image column 109 points to the data of the item as the last transaction that touched the item left it. It is updated whenever a transaction updates the item.

We use our transaction column 10A to support update operations initiated by Unaware application 21.

Such transactions may, on one hand, be completely delegated (their retrieval operations included) by our DBMS 22 to the unaware DBMS 12 from the moment the first update operation is encountered. They can, on the other hand, be supported by our DBMS 22 to a larger extent in a method where our DBMS delegates only the update operations themselves and creates or completes cache entries for items it initiates update of, on the moment it gets a response from the unaware DBMS 12 for the update operation it delegated to it. In such an implementation we can use the our transaction column 10A to permit our DBMS 22 to return After image data to our application 21, whenever our application 21 retrieves data of an item it updated in the context of the current transaction, while preventing other reading processes from accessing that after image before the transaction has committed.

Figure 3:
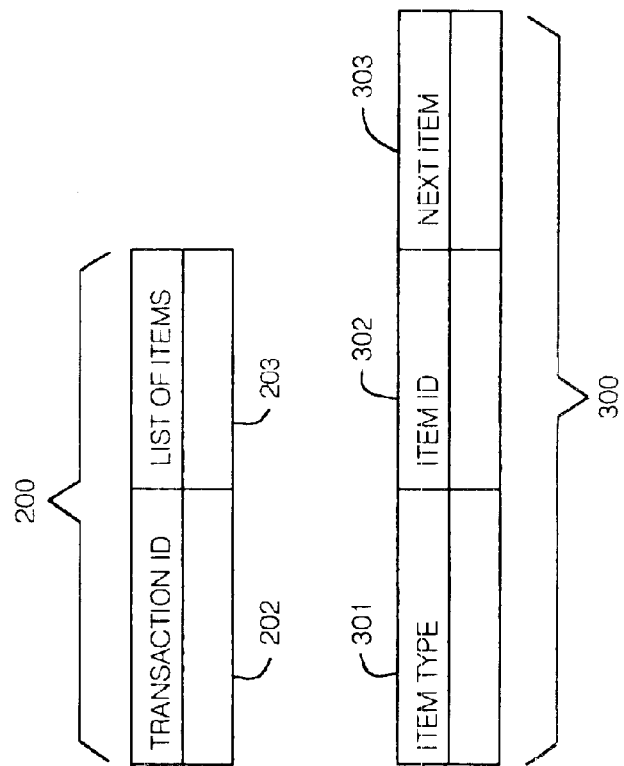
FIG. 3 shows the structure describing a transaction.

FIG. 3 depicts the structure we use to describe an executing transaction.

As a matter of fact it is just an index structure over the list of items of interest 100.

This index structure consists of two types of segments: the transaction segment 200, keyed by the transaction ID 202 and the item segment 300 pointing through the item type 301 and item ID 302 columns to the corresponding item entry 100.

The item segments constitute a list that is pointed to by the list of items column 203 of the transaction entry 200 and whose elements are concatenated through the next item column 303.

This structure is created when the first item updated by a transaction is detected, it is updated whenever an item is updated by this transaction and it is used when the transaction completes, to find all the item entries 100 that have to be updated.

Figure 4:
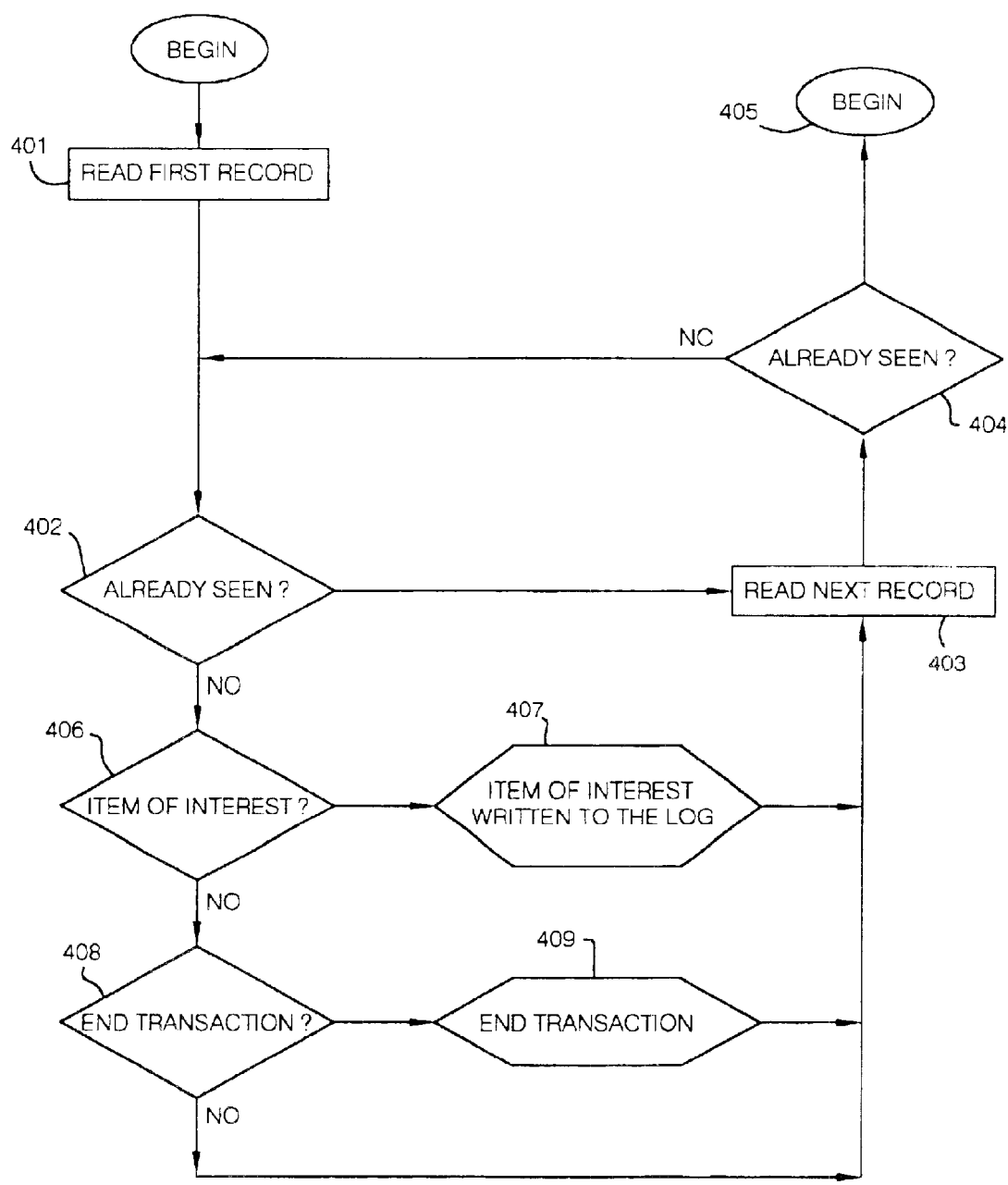
FIG. 4 describes what we do when a physical block is written to the log.
Figure 14:
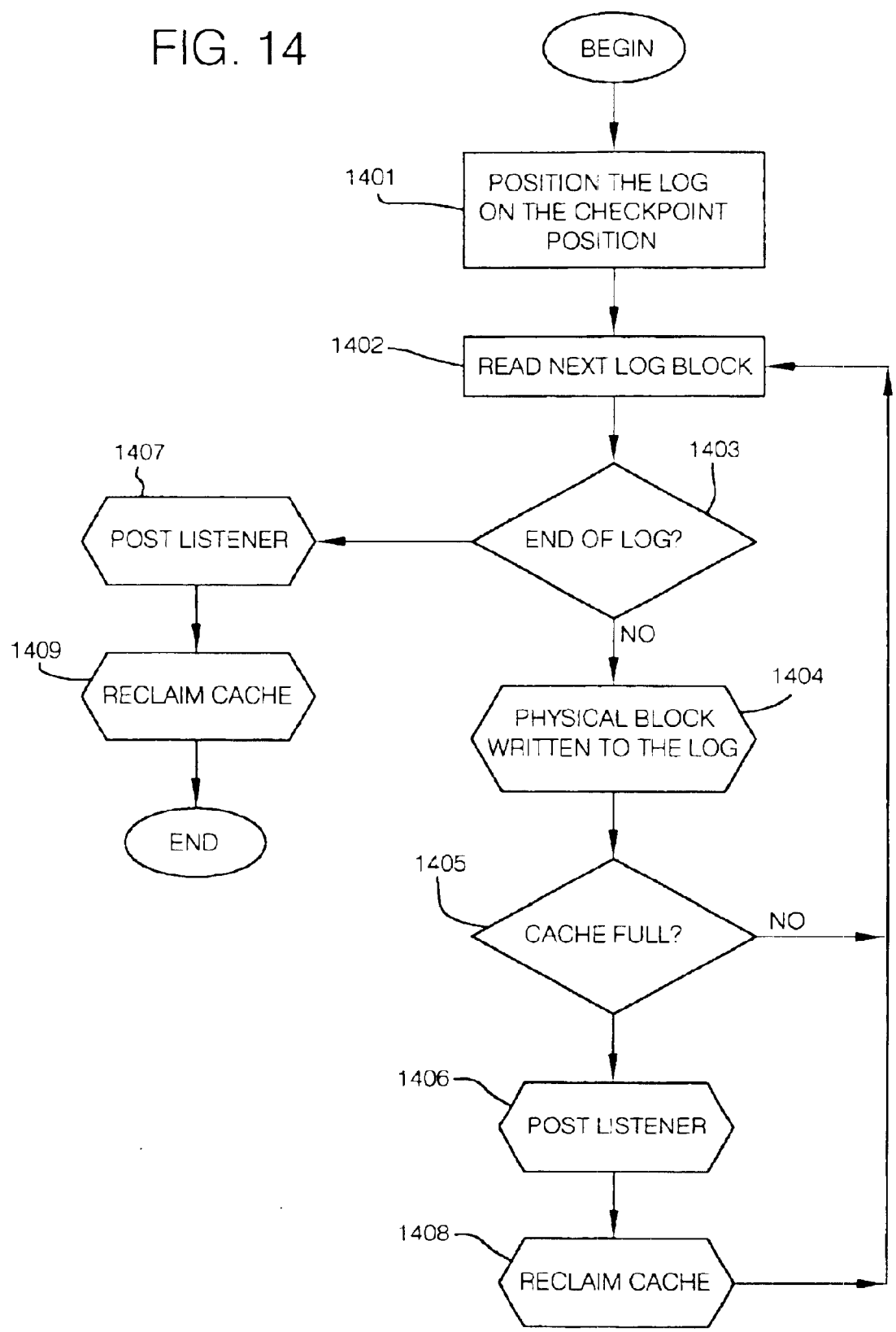
FIG. 14 shows how we Recover the system after failure.

FIG. 4 describes how we react when the listener 3 (in FIG. 1) detects an update to the log or when the recovery process, depicted in FIG. 14, reads a block from the log. Updates are written to the logs in blocks. Each block may contain parts of a plurality of records and the main loop described in this Figure goes through all these records. The main loop stops when, while looking for the next record in 403 we encounter the end of the block. This condition is checked in 404.

Since the same log block may be written to the log several times (Log blocks are usually written by the DBMS whenever the log output buffer is full or when a transaction completes. In the latter case, if the output buffer is not full, the same block may be written again.), we first check in 402 whether or not we already handled this block record. If we did, we skip it, going directly to read the next record in 403.

We continue to process records that have not been handled according to their type. Records detected in 406 as representing an update to an item of interest are processed in 407 by the "Item of interest written to the log" routine depicted in FIG. 5. Records detected in 408 as representing the end of a transaction are processed in 409 by the "End transaction" routine, depicted in FIG. 6.

Once the record has been handled, the loop continues in 403 to the next log record.

FIG. 5 shows the "Item of interest written to the log" routine invoked in 407 at FIG. 4.

Each log record describing the update of an item of interest contains the identification of the transaction of which this update is part. We use this identification to check in 501 if a transaction entry for the transaction containing the current update has already been created. If not, we activate in 502 the "Begin transaction" procedure depicted in FIG. 6.

Although only one transaction can update a given Item of interest at a given moment, there still may be an entry for this item already in cache, since it could have been created by a read request, as will become more apparent in the sequel, or kept in the cache due to performance considerations. This is why, even if we are just beginning a transaction, we still have to check in 503 whether or not a cache entry for the current item already exists in the cache. If such an entry exists, we check in 504 whether or not this entry is already in the context of a transaction. If it is not, we go to 506 where we concatenate this item entry in the context of the transaction (we insert an entry of type 300 to the list of items 203 of the transaction whose ID appears in the current log record) and create the before image 108 for the item. If it is, we go directly to 507 where we update the cache entry to contain the new after image 109 and dirty part 103. We don't need, in this case (the case where in 504 we discovered that the item entry already belongs to a transaction) to check whether or not the transaction entry 200 the item entry is currently concatenated to is the one appearing in the current log record since at any point in time only one transaction can hold the lock for updating this item. We do not and should not update the before image in this case since the before image we always want to use is before the whole transaction and not before some specific part of it.

If, in 503, we discover that the cache does not contain an entry for this item, we create one in 505.

An item cache entry that has just been created is never in the context of a transaction, so we don't have to check this possibility (as we did for existing cache entries) and we proceed directly to 506 where we concatenate the entry we just built to the context of the current transaction and create the before image 108 for the item. From 506 we always proceed to 507 where we update the cache entry to contain the new after image 109 and dirty part 103.

There is an exception to the behavior just described in 507, in the case where the transaction is one that has been initiated by an unaware application 21 using our DBMS 22. In such a case, which we identify through the 10A column, we do not take the after image information from the log record, since our DBMS 22 creates it at the moment it completes the update and updates the after image column 108 and dirty part column 103 accordingly.

Figure 6:
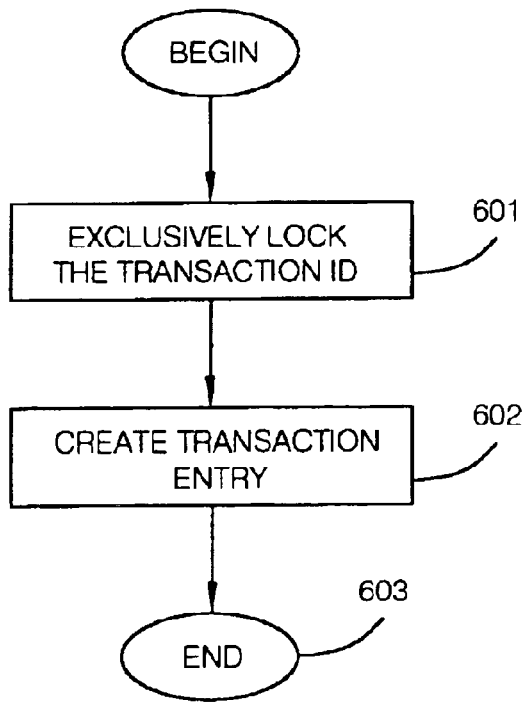
FIG. 6 shows how we react to the beginning of an update transaction.

FIG. 6 illustrates the "Begin transaction" routine invoked in 502 of FIG. 5 whenever the first update of an Item of interest in the context of a transaction is encountered in the log. What this routine does is very simple. First, in 601, it obtains an exclusive lock for the transaction ID. The same lock will be requested, by reading processes, in shared mode, whenever these processes decide to wait for a transaction to complete. Obtaining this exclusive lock does never involve waiting for it since it is requested at the first moment the system becomes aware of this transaction and, of course, no reading process has ever tried to obtain a shared lock for this transaction up to this moment. Therefore execution continues immediately to 602 where the transaction entry 200 is created.

Figure 7:
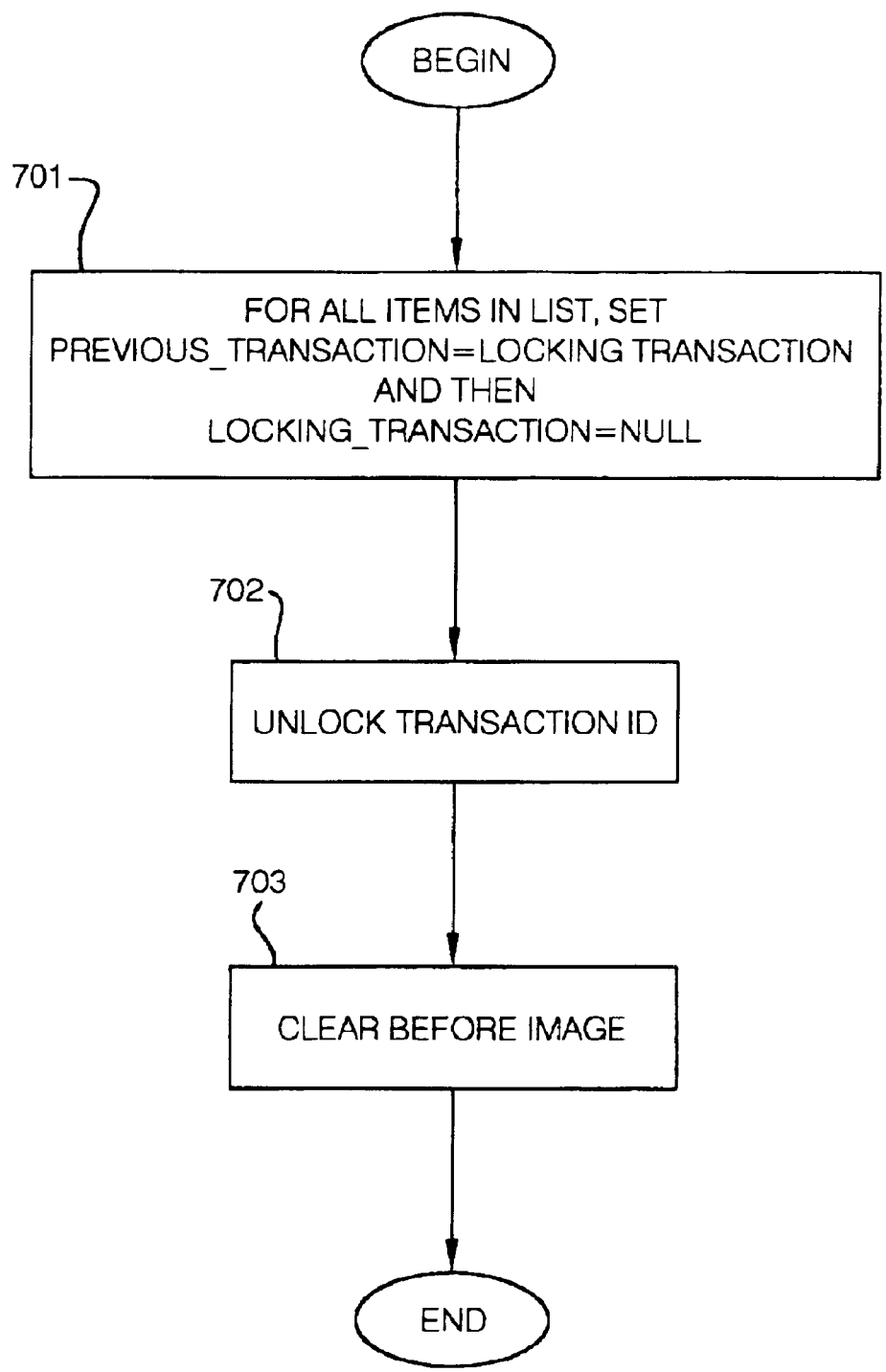
FIG. 7 shows how we react to the end of an update transaction.

FIG. 7 shows what happens when the "End transaction" function is invoked from 409 in FIG. 4.

First, in 701, all items 100 pointed to by the elements 300 of the list 203 associated with the current transaction, are updated so that their previous transaction column 104 contains the identification of the transaction that is now terminating and their locking transaction column 105 is NULL. This is done since the reading processes check the items they are interested in, in their own discretion and they use this column to verify whether these items have been updated since they last read them.

Having updated all these items, the end transaction routine releases the lock it held for this transaction, enabling processes that have been waiting for its termination to continue. Then the before image is cleared since no reading process will need it again.

Note that the term "end transaction" also refers to an abort of the transaction.

The description in this Figure relies on the assumption that the "undo" operations are also reflected in the log, in the context of the aborting transaction. If this is not the case then, before clearing the "before image", we copy it to the "after image".

As will become apparent in the sequel, there is more to do at the end of a transaction if repeatable read and serializable isolation levels are to be supported. This is explained in the context of FIG. 17.

Figure 8:
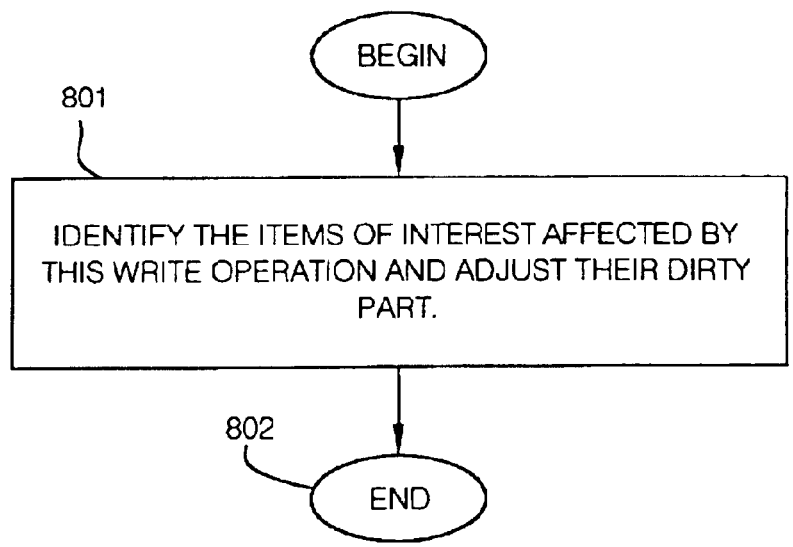
FIG. 8 describes what we do when a physical block is written to the database.

FIG. 8 describes the activity that is performed each time the listener 3 identifies a write of a database block. We perform this activity in order to be able to remove data items 100 from the cache.

This may be the best place to further elaborate on the way we use the before image 108, the after image 109 and the dirty part 103, to construct the data we return to a reading process. The before image 108 is relevant only for transactions that have not yet completed. After a transaction completes, we'll always use the after image 109. This is why there is no question about when the before image can be removed from the cache. With this in mind it is easy to understand why the dirty part 103 only describes the after image 109.

When a data block is written, it will usually contain the whole or parts of items of interest that are represented in the cache. There is no mechanism that tells us explicitly which of these data items is being updated by this write operation; a perfectly plausible case could be the one where two data items for which we have entries in the cache have parts in this block, but only one of them is updated by the current write operation. Such a situation will normally occur when one of the data items has been updated by a transaction that already committed, while the other is being updated by one that is still running, but there are cases where even this can not be said, since the unaware DBMS 12 may decide to write to the disk the results of a transaction that is still processing.

Therefore, in 801, we do the following:

For data items, which are not currently involved in any transaction, we can assume that the part of the data that is being written to the disk is identical to the one we have in cache, and we exclude this part from the dirty part description. For data items that are still being processed by a transaction, we simply compare the data that is being written to the disk with the data in the cache and update the dirty part accordingly.

FIG. 9 shows an unprotected read operation. Such a read operation may be issued only when there is no risk that the read operation will encounter structure inconsistencies or when our DBMS 22 has means to deal with the structure inconsistencies that may be encountered. Another condition that should be met when such a read is issued is that the unaware application for which it is performed is willing to accept the data inconsistencies that may be encountered (This is the default behavior of read only applications in most DBMSs; transactions that read an item that is currently being processed by an update transaction do not see the results of that update until the update transaction commits. After the update transaction has committed, if the same reading transaction tries to access the same data item again, it will see the results of the update. This behavior is usually referred to as "read committed" isolation level).

The implementation of unprotected read requests is simple.

First we check in 901 whether or not the specified data item is in cache. If it is not then, in 902, we take it from secondary storage. If it is in the cache, we check in 903, if it is locked by an active update transaction. If it is not, we take in 904 the after image 109 from the cache. If it is, then in 905, we take the before image 108. This is the place to explain that both before and after images could be nonexistent, meaning that, respectively, the current transaction is in the process of inserting this item into the database or the last transaction has deleted it from the database.

This Figure can also be used to illustrate how the "read uncommitted" isolation level can be supported. Simply ignore the verification of the locking transaction in 903 and always proceed to 904 and take the after image.

FIG. 10 shows how a protected read is performed.

This is the protected read of a single item of interest. For such a read to be effective, the reading process must make sure that the data that was used to decide about the fact that this item should be read and about where it should be found, can be relied upon. This can be achieved by either, some database dependent knowledge telling us that this information can not change (like, possibly, the information about the location of the root of the index), or by reading this information in a protected read and reacting to its potential premature invalidation, as a result of its update by the unaware DBMS 12, by executing the relevant part of the read sequence again when required.

To perform such a read we first check in 1001 whether or not the item in question is already represented by an entry 100 in the cache. If not, we create such an entry in 1002 and we register interest in it 1003, as further explained in FIG. 11.

Then, in 1004, we check whether or not this cache entry 100 also points to a before image 108 or after image 109. If not we can deduce that the item is not locked and read the data from the disk, as we do in 1009. Otherwise we memorize in 1005 the items previous transaction 104. To enable it, we create and maintain, for every reading process a list of items of interest the process depends upon, who need to be checked at a later stage to make sure no premature change has influenced them. This list is described in FIG. 15 and in 1005 we copy the previous transaction column 104 from the item's entry 100 into the previous transaction column 1503 of the entry 1500 of FIG. 15. Memorizing the previous transaction is the first activity we perform in a loop that will only terminate when in 1006 we confirm that the item is not locked by any other transaction. If, in 1006 we discover that the item is locked by another transaction, we wait in 1008 for this transaction to complete and then we go again to 1005 and restart the cycle. If, on the other hand, we discover in 1006 that no transaction locks the item in question or that the transaction locking it is our transaction then we read its after image from the cache (or from the disk, if the cache has been freed) in 1007. Some explanation is needed here for the term "our transaction" used in the above sentences. Update operations are delegated, by our DBMS 22, to the unaware DBMS 12. It is the unaware DBMS 12 that assigns these operations a transaction ID and it does not, knowingly, tell us what this transaction ID is. Nevertheless, our DBMS 22 can still associate a cache entry with the unaware application that is currently updating it, using the our transaction column 10A as explained in the context of FIG. 2. This is needed, of course, only if we choose to implement reads initiated in the context of transactions that have been discovered to be update transactions, by our DBMS 22 and not delegate them to the unaware DBMS 12.

Note that in order to support the standard "Repeatable Read" isolation level, protected read could be used for all read operations.

Figure 11:
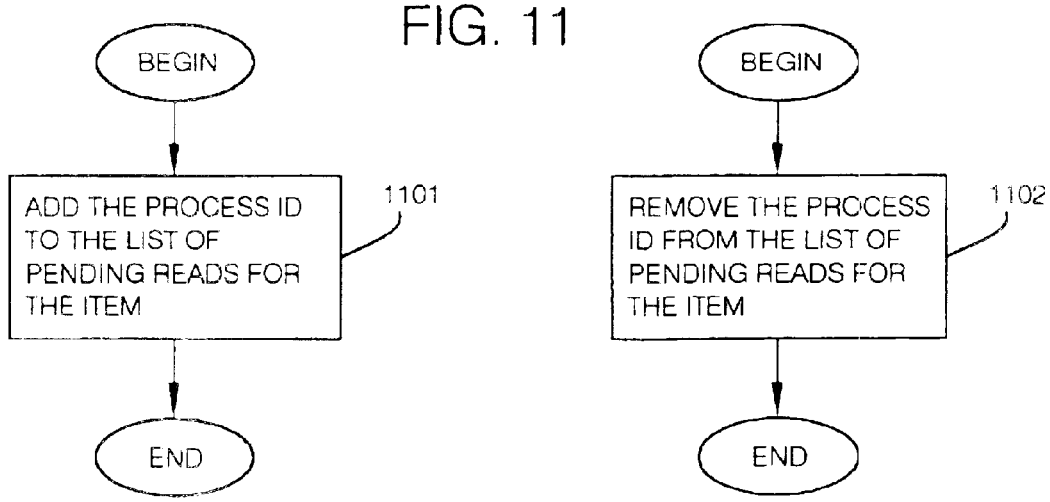
FIG. 11 shows how we register and unregister interest in item.

FIG. 11 depicts the processes of registering and unregistering interest in an item.

To register interest in an item we add in 1101 an entry containing the reading process id to the list 107 of pending reads interested in that item.

We do it when we read the item with the intention to use its data, in a sequence of read operations that should be consistent with that data.

This will prevent the premature removal of this entry from the cache.

To unregister interest in an item we just remove in 1102 the entry created for the process when interest was registered.

We unregister interest in an item when the said sequence of read operations has been completed.

The process responsible for reclaiming unused cache entries can rely on the pending process list 107, and reclaim the storage occupied by entries 100 for which the pending process list 107 only contains ids of processes that are no longer running.

Figure 12:
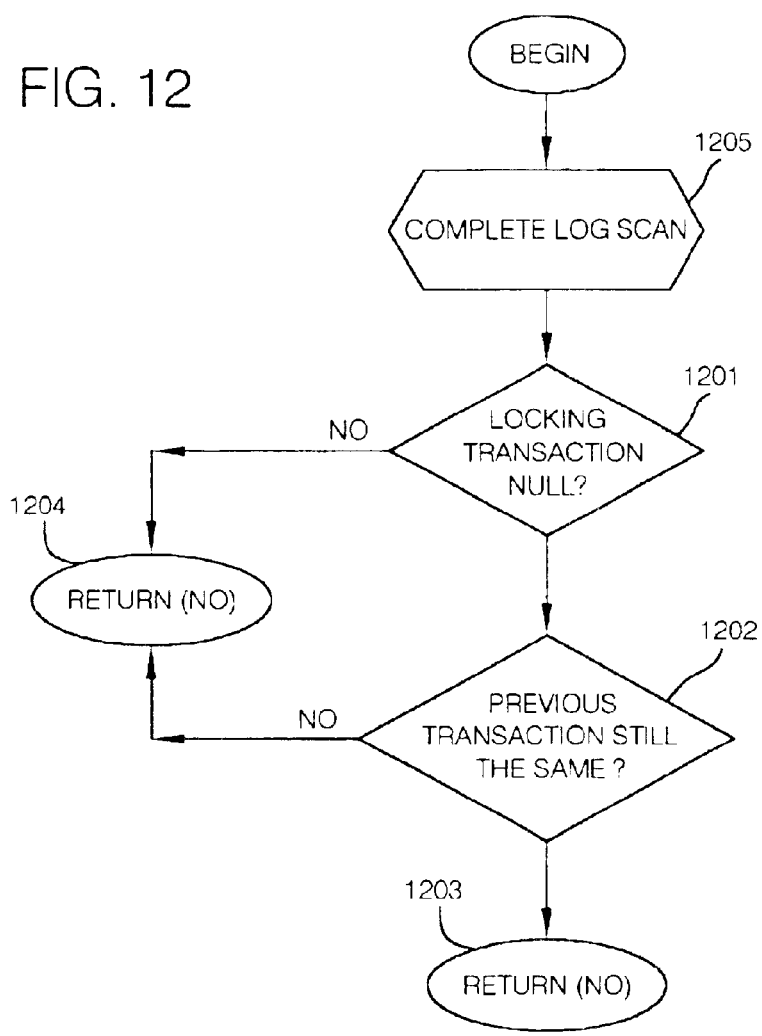
FIG. 12 shows how we check an item's validity.

FIG. 12 describes how a reading process may check the validity of an item of interest it read in the past. This is needed since the listener 3 only listens to the write operations the unaware DBMS 12 performs to the disk. It does not delay them. This results in the inability of the reading process to prevent the unaware DBMS 12 from altering and invalidating data items it relies upon during operations that, from the perspective of the reading process, consist, inter alia, of a plurality of read operations, but, from the unaware application's 21 perspective, are expected to be atomic. In such a case, the reading process may, for example, after having read an index block, verify if the upper level index block that pointed to the current one is still valid, since it may, otherwise, confront an inconsistency. This is just an example since the need to perform such a check is unaware DBMS 12 dependent and it may so happen that for some types of index and some types of DBMS, it is not needed, since the DBMS itself perform index block splits with no locking (as is the case with index type 2 in DB2).

The validity of an item of interest that has been read is checked as follows.

First, in 1205, we make sure we are aware of all the log records that have been written up to this moment. When the listener is a real time hardware device, this activity is void but when the listener is a software process that periodically polls the log, this activity means reading the tail of the log and processing the information it contains to update the cache. Then, in 1201, we check whether or not this item is locked by some transaction. If it is then the item is invalid and this is what we return in 1204. Otherwise, we verify in 1202 if the previous transaction 104 for this item is still the same as it was when we read this item. We do it through a comparison of the previous transaction column 104 of the item 100 and the previous transaction column 1503 of the corresponding entry 1500 of the process item list. If not we deduce that the item has been invalidated and we return 'no' in 1204. If the previous transaction 104 is still the same, then the item is valid.

Figure 13:
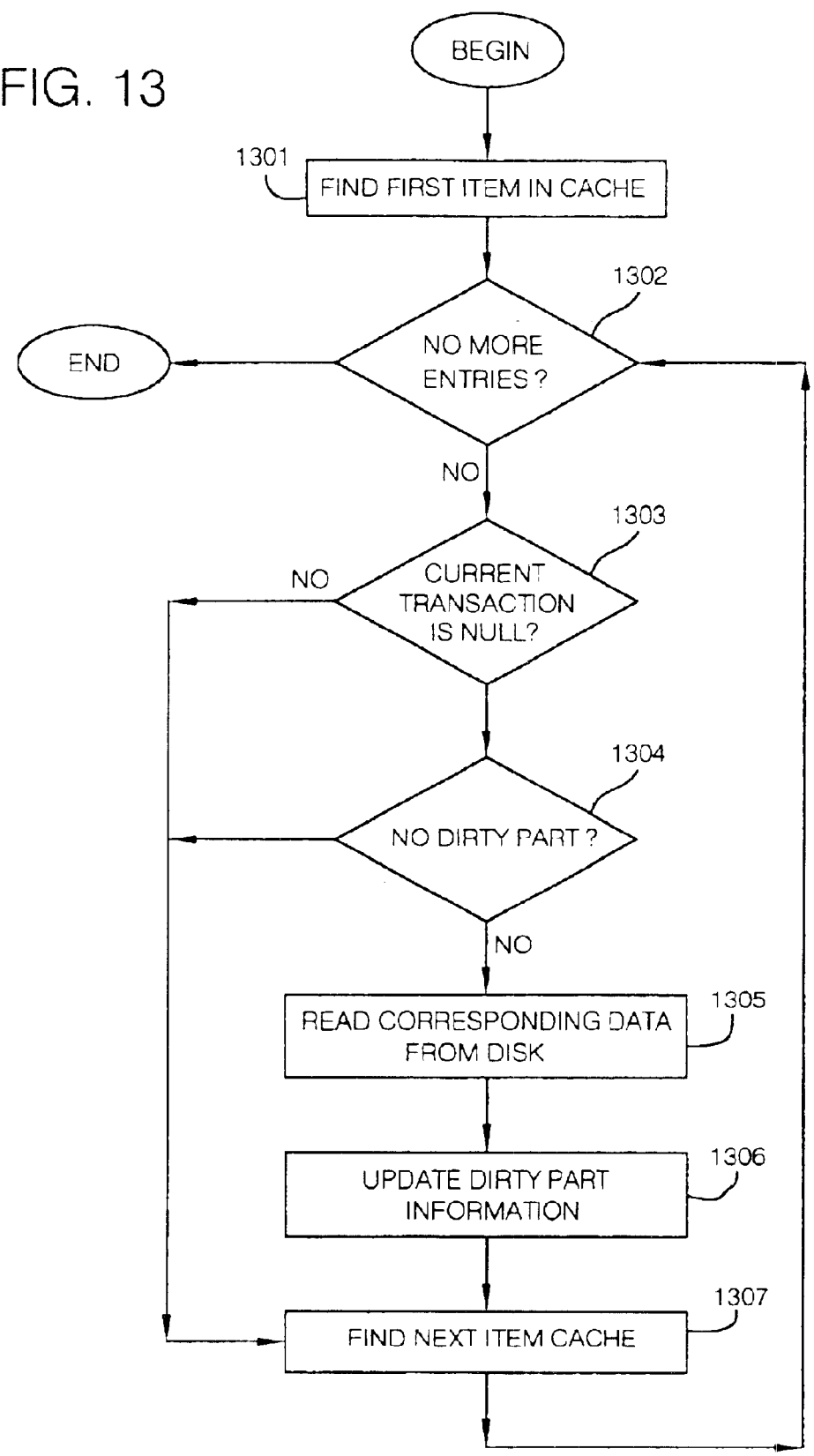
FIG. 13 describes the Post listener.

FIG. 13 illustrates the way the post listener maintains the dirty part information 103 of item cache entries 100. The post listener is activated on a periodical basis or in cases of cache memory shortage, when the listener is not aware of all the writes, performed by primary system 1 to the database files 5. It is also used in the recovery process as will be explained in the sequel.

When activated, the post listener scans all the item-of-interest-cache-entries 100. In 1303 it selects for further manipulation all those whose locking transaction field 105 is NULL. For these entries it verifies in 1304 whether or not anything needs to be done. Item entries which have already been discovered to have been completely copied to the disk, need no additional attention. The dirty part column 103 of other items needs to be updated. For this purpose, the corresponding data on the disk is read in 1305 and compared to the data in cache. The results of this comparison are used to update the dirty part column 103.

FIG. 14 shows the process of recovery after a failure in secondary system 2.

The only data available for recovery is that of the database log file 4 and database data files 5.

The information contained in the cache has been lost, as well as the information that would have been inferred from the listener's detection of the write of physical data blocks, for the blocks written by the unaware DBMS 12 while secondary system 2 was inactive.

To make the recovery process possible, our DBMS 22 should record, from time to time, on non volatile storage, the identification of the oldest transaction number appearing in the previous transaction column 104 of all the items of interest entries 100 in the cache for which the dirty part is not empty.

This transaction will designate for us the position on the log from which the recovery process should start since all earlier transactions have already been written to the database data files 5.

Our first activity, during the recovery process is the positioning of the log in 1401, on the beginning of this transaction.

Some DBMSs provide, on their log, special records designating places, in the log, where the log and the data are synchronized.

When the unaware DBMS 12 is such a DBMS, there is no need for our DBMS 22 to record the oldest transaction number just described since these synchronization points can be used instead—In 1401 we just scan the log back from its end to the latest synchronization point.

Note that in such cases, the initial activation of our DBMS 22 is no different than a recovery, while, in cases where our DBMS has to create the checkpoint position, the initial activation has to depend on some special activity on the unaware DBMS 12 like a quiesce or stop when we want to bring our DBMS 22 up for the first time.

Depending on the unaware DBMSs logic, other means can be adopted as suitable.

At this point we start a loop that reads the whole DBMS log file 4 in 1402 and stops after all the log blocks have been read, as detected in 1403.

For each block we read from the log, we activate in 1404 the "Physical block written to the log" routine depicted in FIG. 4. We can, actually, activate a special purpose version of this routine, since during the recovery process there is no risk of reading the same log block twice.

After handling the block we check in 1405 whether there still is enough room in the cache. The question in the Figure is "Cache full?" but what we actually check is whether or not there still is room for the maximal amount of items we may have to put in the cache while handling the next log block.

If there is not enough room, we activate the post listener in 1406 and clean the cache from items that are already expressed on the disk in 1408.

When we discover, in 1403, that all the log blocks have been read, we once again invoke the post listener in 1407 and, optionally, reclaim cache in 1409.

Figure 15:
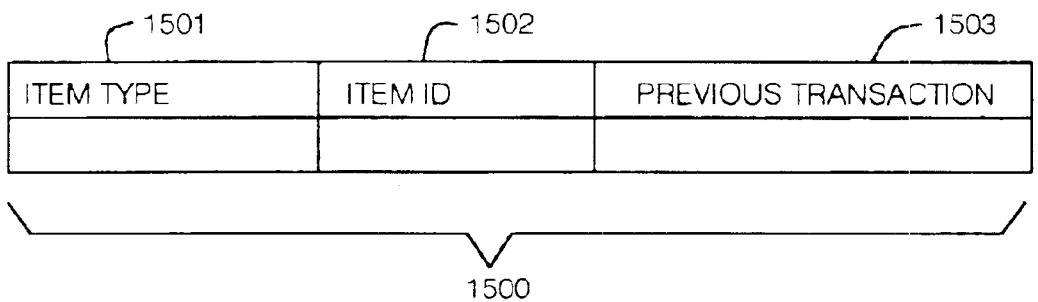
FIG. 15 describes the entries in the Process items list.

FIG. 15 shows the structure of the elements of a list each reading process maintains in order to memorize, while executing a protected read, the previous transaction column of an item it retrieves, and compare it, at a later stage, to the new value of this column in the item entry. This comparison is needed for the process to be able to determine whether or not the item has been invalidated, and the relevant part of the read sequence should be restarted.

The first two columns of this structure are the item type 1501 and item ID 1502 which are used to identify the corresponding item entry in the cache entry 100, where they are compared to item type 101 and item ID 102 respectively. The previous transaction column 1503 is copied into this element upon its creation, from the previous transaction column 104 of the item entry 100.

When the validity of the item a reading process read has to be checked, as described in FIG. 12, we compare the 1503 column to the corresponding 104 column.

Figure 16:
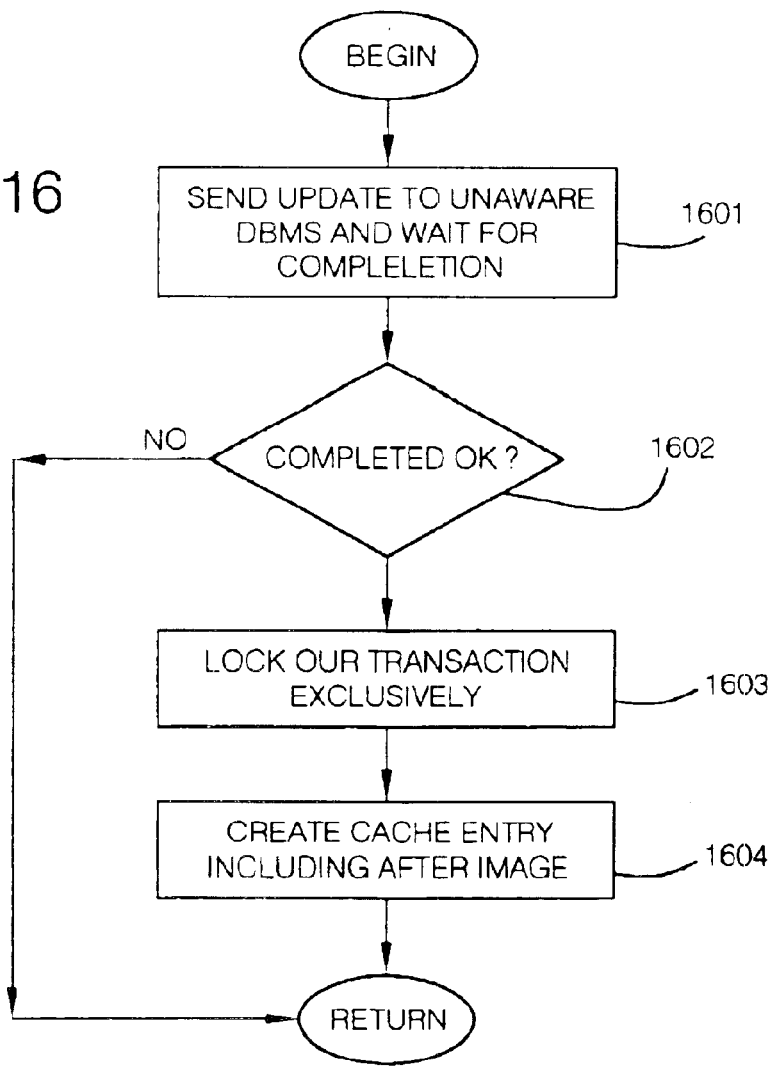
FIG. 16 shows how we initiate update operations.

FIG. 16 describes the delegation of update operations to the unaware DBMS 12 in an embodiment where read operations initiated by an unaware application 21 in the context of a transaction that has been discovered to be an update transaction are serviced by our DBMS 22.

If such read operations are delegated to the unaware DBMS 12 then the delegation of update operations is straightforward; we simply have to send the operation request to the unaware DBMS 12 and wait for its completion, as we do in 1601, and return the results to the caller. That's all.

If, however, we want such read operations to be serviced by our DBMS 22 then we have to maintain, in the cache, an after image where the update operations we performed are manifested as soon as the update operation completes. We cannot wait for the regular manifestation of these changes through the log since the updating process may want to read the item again before the unaware DBMS 12 writes the change to the log.

This is why, in such cases, we continue after 1601. If the update operation succeeds, as we verify in 1602, we obtain an exclusive lock for our transaction so that other transactions waiting for the completion of this one can ask for a blocking shared lock for that same transaction and be wakened when the current transaction completes. Then, in 1604 we create cache entries 100 for all the items the current update operation affected, including, when appropriate, data items updated by triggers. We already know we have update locks for these items in the unaware DBMS 12 since otherwise our update operation would have blocked us.

Note that there are several ways to create the cache entries for the affected items and the selection between them should be a design decision that will mainly rely on performance optimization considerations. The questions that have to be decided upon are when to create the before image 108 and the parts of the after image 109 that are not those we know the values of simply through the fact that the update operation has assigned them a value.

For simplicity we'll assume here that we create these parts of the cache entry at this stage, simply by reading the required data from the disk and making the necessary calculations. Other alternatives would be to create at least parts of this data, only when it is requested for retrieval but this alternative is simpler. Note that at this stage, nobody but us can change the data items we are updating.

Figure 17:
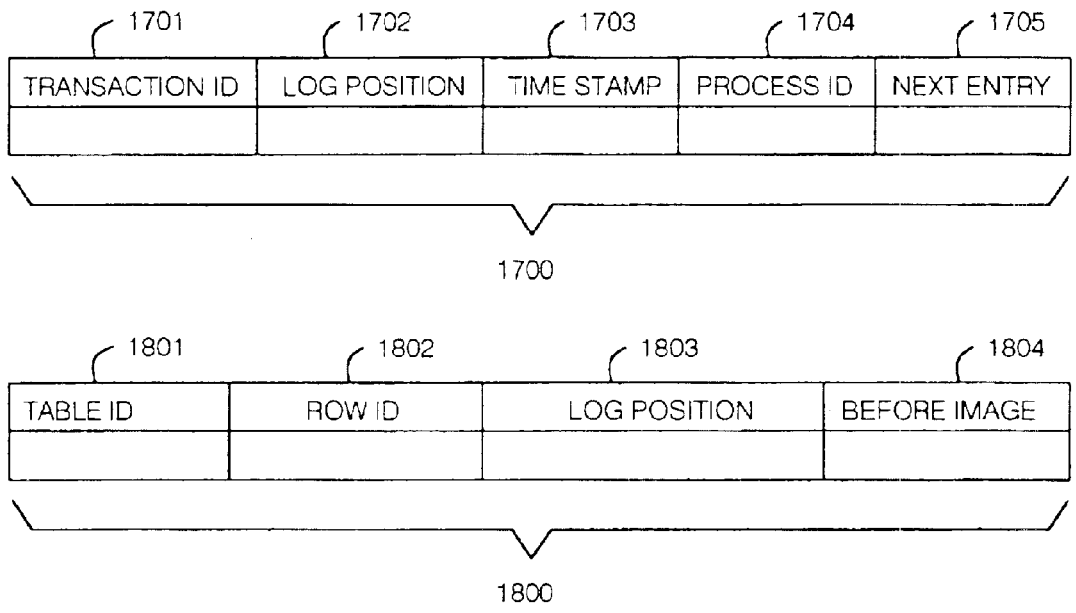
FIG. 17 shows the structures used to support snapshots.

FIG. 17 shows the data structures used for supporting snapshots—virtual "point in time" images of the database. These snapshots can be used by our DBMS to provide a more efficient implementation of "repeatable read" and "serializable" isolation levels.

For each transaction requiring any of these isolation levels, a Transaction Snapshot Entry 1700 is created in cache. Whenever such a transaction terminates, its entry is removed from cache.

The Transaction Snapshot Entry 1700 contains the following attributes: The Transaction ID 1701, identifying the transaction, the Log Position 1702 containing the last position in the log that has already been read when the transaction was issued, the Time Stamp 1703 that can serve for date related functions that may be required by the transaction's logic, and the process ID 1704, pointing to the process that issued the transaction to enable the cache reclaiming process to delete this entry if the process fails to terminate the transaction. In cases where the log records contain a timestamp (like IBM's DB2), the best source for the Time Stamp 1703 is the log record that served as the source for the Log position 1702.

Figure 18:
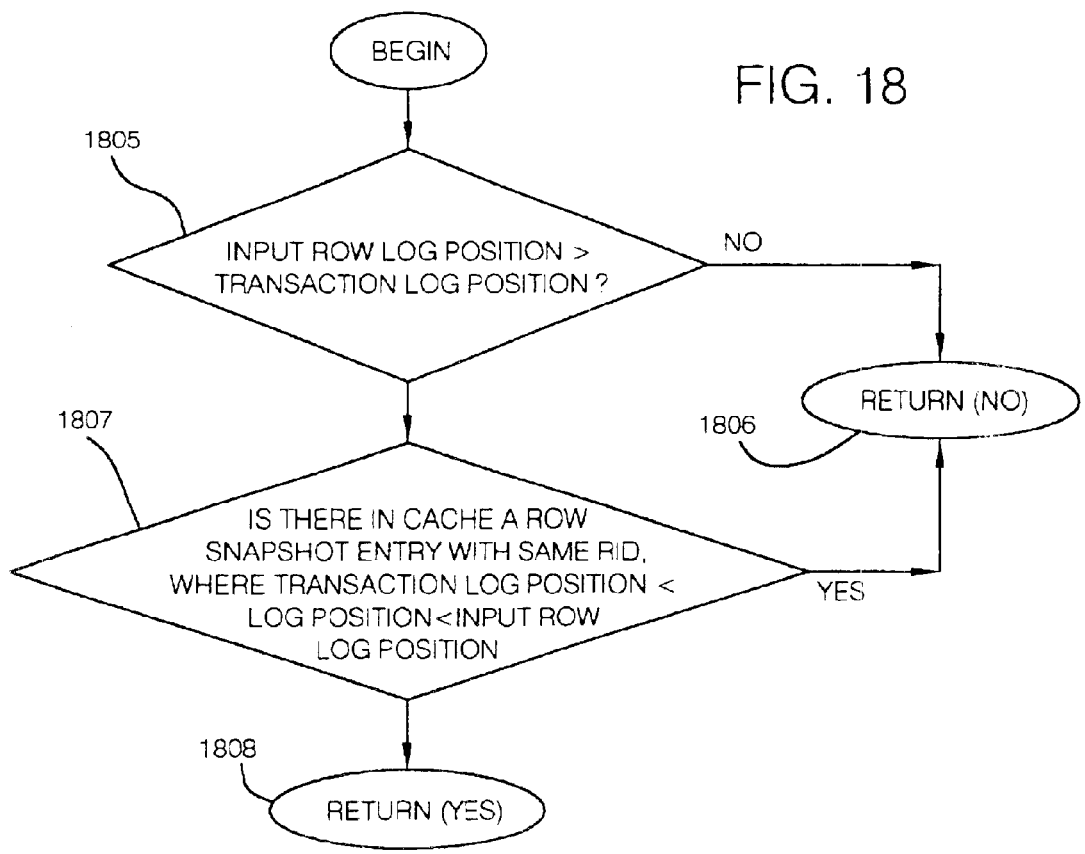
FIG. 18 describes the is_needed function.

Whenever a before image is removed from the cache due to the termination of a transaction a candidate Row Snapshot Entry 1800 is created where the Log Position 1803 is respectively the log position of the end of the transaction, the list of Transaction Snapshot Entries 1700 is scanned and for each Transaction Snapshot Entry 1700 the is_needed function, depicted in FIG. 18 is invoked with the Row Snapshot Entry 1800 and the Transaction Snapshot Entry 1700 as parameters to verify if a Row Snapshot Entry 1800 of this row needs to be created for this transaction. If a transaction is detected for which a Snapshot Entry 1800 of this row is needed in cache, the entry is created and the scanning of Transaction Snapshot Entries stops. Slight variants of the same is_needed function can be invoked by the cache reclaiming function to verify which Row Snapshot Entries 1800 can be deleted and by the snapshot_read function described in the sequel to verify if the Row Snapshot Entry 1800 should be used by this read.

The Row Snapshot Entries 1800 consists of the following columns: The Table ID 1801, designating the table to which the row belongs, the Row ID 1802 identifying the row, the Log Position 1803 used by the snapshot_read function, described in the sequel, to verify whether or not it should use this Row Snapshot Entry 1800, and by the cache reclaiming process and the Before Image 1804 of the row that will be returned by the snapshot_read function when it decides the current Row Snapshot Entry 1800 should be used.

Special care must be taken when LOBs are to be supported.

LOB updates are generally not reflected in the log and the detection of such updates must be either performed through other means or obviated.

The two approaches are possible in variations of this embodiment:

In one variation, if the listener is a hardware listener, the before images of LOBs can be intercepted whenever a version of a LOB is removed from the disk (delaying the delete operation until the interception is completed).

In another, variation, repeatable read operations may be issued from time to time by our DBMS 22 against the unaware DBMS 12 and force it to maintain the LOB versions that are still in use by unaware applications 21 using our DBMS 22. This approach will work if the unaware DBMS 12 keeps the LOBs in the database for as long as read only transaction that started before the update is alive, regardless of whether or not this transaction has attempted to read this LOB.

FIG. 18 describes the is_needed function referred to in the description of FIG. 17.

The purpose of this function is to verify whether or not a specific Row Snapshot Entry 1800 is needed for the correct execution of a given transaction requiring snapshot read. While a specific transaction needs at most one Row Snapshot Entry 1800 for a given row, multiple such entries may be kept in cache, since multiple transactions requiring snapshot read can be simultaneously active and a given row may be updated several times during the execution of such a transaction.

A given transaction, described by a Transaction Snapshot Entry 1700, only needs a Row Snapshot Entry 1800 if the row in question is created, updated or deleted during the execution of the transaction. This means that in order for a Row Snapshot Entry 1800 to be needed for a transaction described by a Transaction Snapshot Entry 1700, the Log Position 1803 must be higher than the one reflected in cache when the transaction began, as saved in Log Position 1702 in the Transaction Snapshot Entry 1700.

This condition is checked in 1805 and if it is not met, the is_needed function returns "NO" meaning "not needed" in 1806. It should be noted that this verification of Log Position, as performed in 1805, is not needed when the Row Snapshot Entry 1800 is created since the is_needed function is only invoked, in this case, for Transaction Snapshot Entries 1700 that have been created before the update was encountered and their Log Position 1702 is necessarily lower than the one in which we encountered the update operation but since this Figure is there to support all possible uses of the is_needed logic, including its use by the Snapshot Read and by the cache reclaiming process, this verification is there.

If the above condition is met, meaning that the row was updated after the transaction started, another check is performed in 1807.

Here we verify if there is no earlier update to the row in question that is reflected in a Row Snapshot Entry 1800 with a Log position 1802 which is lower than the one appearing in the input Row Snapshot Entry 1800, but is still higher than the Log Position 1702 appearing in the input Transaction Snapshot Entry. If there is such Row Snapshot Entry 1800 then the transaction described by the input Transaction Snapshot Entry 1700 only needs this Row Snapshot Entry 1800 and not the Input Row snapshot Entry 1800.

It has already been described how the is_needed logic is used when Row Snapshot Entries 1800 are created, and here is a good place to describe the way this logic is used for cache reclamation and for Snapshot Read.

In the cache reclaiming process, all Transaction Snapshot Entries 1700 are checked against a given Row Snapshot Entry 1800, using the is_needed logic.

If no transaction needs the Row Snapshot Entry 1800, its space is reclaimed.

Figure 19:
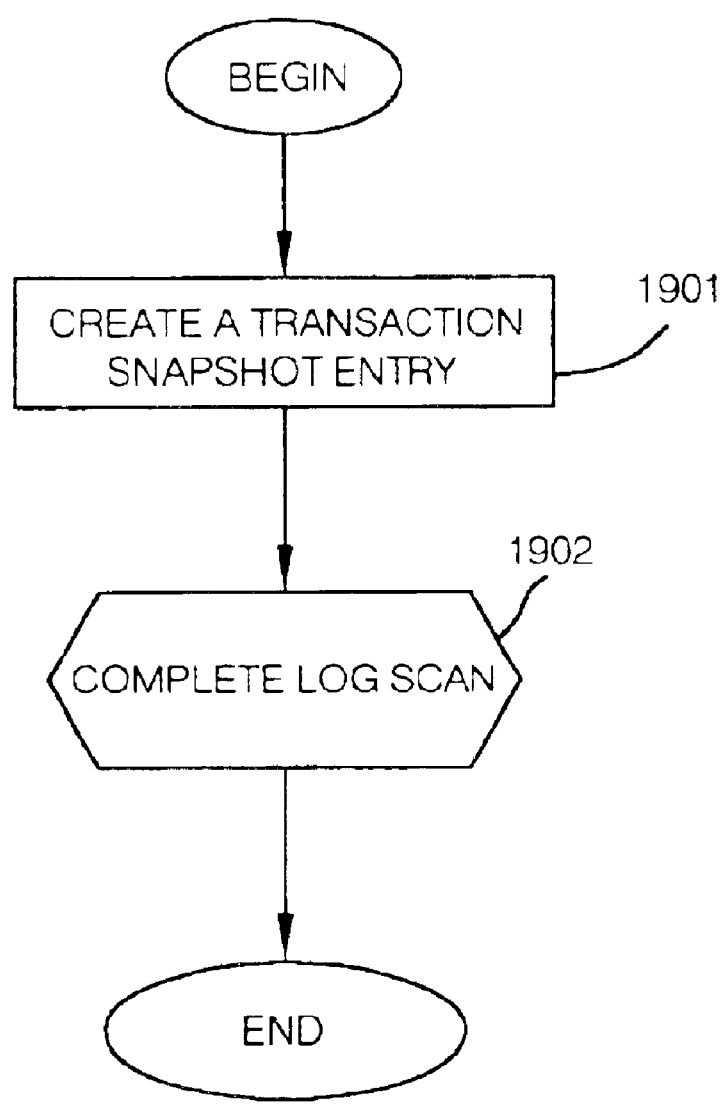
FIG. 19 shows how a serializable transaction is started.

FIG. 19 shows how a serializable transaction is started. Note that the transactions we mean here, are transactions that are initiated by the unaware application 21 or by its implications in Our DBMS 22. These are not the transactions we find in the log (although, in the case of update, they may result in such transactions too).

The term serializable is used in the title since this is the actual isolation level provided by the algorithm we describe in FIG. 20 but since repeatable read is always achieved as a by product of serializability and since this algorithm is not more expensive than the one needed only for repeatable reads, it is recommended to base repeatable read support on this algorithm as well.

The first thing we do, when creating a serializable transaction is to create, in 1901, a Transaction Snapshot Entry 1700.

From this moment on, and until this transaction is terminated, every row an update to is detected in the log, will be represented by a row snapshot entry 1800.

Having created the transaction snapshot entry 1700, it is recommended, although not mandatory, to complete the scan of the log. This is what we do in 1702.

Once a serializable transaction has started, read operations in the context of this transaction should use the snapshot_read algorithm.

FIG. 20 describes the snapshot_read function. This function is expected to override the data of the row, as found on the disk and in the active cache, by the before image 1804 of the cache entry 1800 if such an entry is found for the same row which is needed, as verified by the is_needed logic by the current transaction.

It should also make sure that it does not return to the application rows that it read from the disk just because race conditions caused it to read the data from the disk before listener managed to create the row snapshot entry.

The way to achieve this purpose may differ, depending on the unaware DBMS 12.

Some DBMSs (like IBM's DB2) maintain in each page they write, the log position of the transaction that caused the block to be updated. The snapshot read could compare this log position to the Transaction Snapshot Entry Log Position 1702 and if it is higher, keep a copy of the row, complete the scan of the log and try to read the row again. If a Row Snapshot entry is found this time then the snapshot read can proceed to the next row.

Otherwise the copy of the row, created in the first attempt to read it from the disk should be returned.

In FIG. 20 we only describe how this behavior can be achieved in a direct access to a row, based on its RID. The implementation of the same logic for sequential scans of parts of a table is, however, straight forward.

In accordance with the above argumentation, the first action we perform, in 2001, when asked for a snapshot read of a row by its RID, is to verify if there is a row snapshot entry 1800 representing this row, which is relevant to the current transaction. We do it through the implementation of the is_needed logic, described in FIG. 18 for the Transaction Snapshot Entry 1700 of the current transaction and all the Row Snapshot Entries 1800 representing the same RID in their Row ID 1802 column.

It should be noted that although not emphasized in this description, it is recommended that all cache structures will also have various indices enabling more efficient search of these structures. In the current context, an index over the Row ID 1802 column is recommended for all the Transaction Snapshot Entries 1800.

If a relevant Row Snapshot Entry 1800 is found, the before image 1804 of this entry is returned in 2002.

If no such Row Snapshot entry 1800 is found, we check, in 2003, whether or not the row in question is represented by an item of interest entry 100 in the active cache.

If it is then, just as in the unprotected read, we return either the before image 108 or the after image 109.

Otherwise we proceed to 2005 where we check if we already created a copy of this row during this read operation. The purpose of this copy has already been explained earlier and will become clearer in the sequel but if it exists, we return it in 2006.

Otherwise, in 2007, we get the row from the disk. As explained above, it could happen that we find on the disk, updated data that was not yet in the cache when we looked for it. In these cases it is guaranteed that when we find this data on the disk, its reflection is already in the log. This is why, when we detect such a case in 2008, we proceed to complete the scan of the log in 2011.

The intermediate step, 2010 is there to prepare the termination of the second attempt to find the data, as will readily be explained.

Having completed the scan of the log, every update to the row we are interested in, is bound to be found in a Row Snapshot Entry 1800 or in an Item of Interest entry 100.

If we find no such representation then we are driven to the conclusion that the reason for writing the page after our serializable transaction started was an update to another row not to the one we are trying to read.

This is where the copy of the row we created in 2010 will become handy.

We detect this situation in 2005 and return the copy in 2006.

If, however, the more probable case where the page we read from the disk in 2007 does not have a log position which is higher than the one in the Transaction Snapshot Entry, then, in 2009, we return the row we read from the disk directly, without resorting to the second attempt.

Note that for read only applications, this snapshot_read function, provides "repeatable read" and even "serialisable" isolation level functionality with no locking. This is very important in the context of non cooperative DBMSs since there is no way for the reading process to lock anything in the unaware DBMS 12.

This mechanism can also be used when updates are supported but then, if a row is to be updated by our DBMS 22 and the is_needed logic finds that this row has been updated after the transaction started, a deadlock condition should be raised.

To implement the equivalents of the usual implementation of repeatable read and serializable isolation levels is, of course, logically possible, but not recommended since the transaction, unable to effectively lock the data will have to resort to protected read and check item validity, and restart every time the check item validity function fails.

We claim:

1. A data-sharing method wherein a non-cooperative DBMS of a primary computer system participates in unaware applications and has a cache, respective lock structures, database log files and database data files responsive to data requests generated by the unaware applications, said method comprising the steps of:

(a) nonintrusively monitoring data written to said database log files and said database data files and communicating information as to data written to said files to a secondary DBMS running on a potentially different computer and having a secondary cache and secondary lock requests and responsive to data requests by other unaware applications; and (b) processing data in said secondary DBMS between said other unaware applications and with said secondary cache and said secondary lock requests while reading data from said non-cooperative DBMS data files without interrupting update or retrieval activities of said non-cooperative DBMS and while isolating said non-cooperative DBMS from said other applications, thereby enabling said other unaware applications to access the data maintained by said non-cooperative DBMS.

2. A data-sharing method wherein a non-cooperative DBMS of a primary computer system participates in unaware applications and has a cache, respective lock structures, database log files and database data files responsive to data requests generated by the unaware applications, said method comprising the steps of;

(a) nonintrusively monitoring data written to said database log files and said database data files and communicating information as to data written to said files to a secondary DBMS running on a potentially different computer and having a secondary cache and secondary lock requests and responsive to data requests by other unaware applications;

(b) processing data in said secondary DBMS between said other unaware applications and with said secondary cache and said secondary lock requests while reading data from said non-cooperative DBMS data files without interrupting update or retrieval activities of said non-cooperative DBMS and while isolating said non-cooperative DBMS from said other applications, thereby enabling said other unaware applications to access the data maintained by said non-cooperative DBMS; and (c) intercepting data written by said primary computer system to said non-cooperative DBMS and parsing the intercepted data nonintrusively with respect to said primary computer system with a listener and utilizing the parsed intercepted data to establish said secondary cache and secondary lock requests shielding said other unaware applications from inconsistent data of said primary computer system.

3. The method defined in claim 2, further comprising the step of updating, with said secondary DBMS in response to one of said other unaware applications, the non-cooperative DBMS at least in part by delegating update operations and subsequent retrieval operations directly or indirectly to said non-cooperative DBMS.

4. The method defined in claim 2 wherein the cache associated with said secondary DBMS is provided with a storage capacity sufficient to hold the entire contents of the data of at least one of said DBMS.

5. The method defined in claim 2 wherein at least one of said DBMSs is provided with a time function keeping a transaction time for an entire duration of each transaction and creating an appearance of a transaction occurring at a single point in time, thereby supporting true repeatable read and serializable transactions.

6. A data-sharing method wherein a non-cooperative DBMS of a primary computer system participates in unaware applications and has a cache, respective lock structures, database log files and database data files responsive to data requests generated by the unaware applications, said method comprising the steps of:

(a) nonintrusively monitoring data written to said database log files and said database data files and communicating information as to data written to said files to a secondary DBMS running on a potentially different computer and having a secondary cache and secondary lock requests and responsive to data requests by other unaware applications; and (b) processing data in said secondary DBMS between said other unaware applications and with said secondary cache and said secondary lock requests while reading data from said non-cooperative DBMS data files without interrupting update or retrieval activities of said non-cooperative DBMS and while isolating said non-cooperative DBMS from said other applications, thereby enabling said other unaware applications to access the data maintained by said non-cooperative DBMS; said secondary DBMS operating with items of interest having a structure consisting of a part defining an item type distinguishing between parts of a data base, a part defining an identity of the item in the database, a "dirty" part describing parts of an item not previously transferred to storage, a part describing a previous transaction involving the item to permit updating of that transaction, a part describing a locking transaction, a part facilitating application of an optimization algorithm, a list of pending reads identifying processes which have shown interest in the item, a part representing a before image constituting a pointer to data represented by the item before the transaction, a part representing an after image of data subsequent to the transaction and a part representing a transaction initiated by a respective one of said other unaware applications.

7. The method defined in claim 6 wherein each transaction with an item of interest is effected in said listener by the steps of:

(i) check whether the item of interest is a first item of the transaction;

(ii) if the item of interest is the first item of the transaction, process the item of interest by exclusively locking the transaction identification of the item of interest and creating a transaction entry therefore;

(iii) if the item of interest is not the first item of the transaction or after the creation of the transaction entry, check whether the item of interest is already in cache;

(iv) if the item of interest is not already in cache, create a cache entry therefore;

(v) if the item of interest is already in cache, check whether the item of interest belongs to a previous transaction;

(vi) if the item of interest is already in cache but does not belong to a previous transaction and following step (iv), concatenate the cache entry with a transaction context and create the before image for the item of interest; and (vii) following step (vi) and, where the item of interest following step (v) belongs to a previous transaction, updating the cache entry to contain a new after image and "dirty" part.

8. The method defined in claim 6, further comprising checking an item of interest read by said listener in the past by the steps of:

(I) checking whether the item of interest is locked by a transaction;

(II) if the item of interest is not locked by a transaction, verifying if the previous transaction for the item of interest is the same as the previous transaction for a prior reading by comparing the previous transaction part of the item of interest with a corresponding entry of the previous transaction at the prior reading; and (III) validating the item of interest when the previous transaction part is the same as the corresponding entry of the previous transaction at the prior reading.

9. The method defined in claim 6, further comprising initiating at time intervals a post listener sequence in said listener which comprises the steps of:

(A) scanning an item of interest cache entry;

(B) selecting entries of items of interest having NULL locking transaction parts;

(C) for each item of interest having a NULL locking transaction part, checking whether the item of interest entry has a "dirty" part;

(D) for each item of interest found to have a "dirty" part in step (C), reading corresponding data from storage and updating the "dirty" part data; and (E) following step (A) in the case of a cache entry of an item of interest having a not NULL locking transaction part, following step (C) for each cache entry having no "dirty" part and following step (D) for each cache entry having an updated "dirty" part, returning to step (A) to scan a next item of interest cache entry until all item of interest cache entries are scanned.

10. The method defined in claim 6 wherein update operations initiated in said secondary computer system are delegated to the non-cooperative DBMS by the steps of: transmitting from said secondary DBMS to said non-cooperative DBMS of said primary computer system an update instruction based upon a read transaction of one of said other unaware applications; checking whether the update of the non-cooperative DBMS of the primary computer system has been completed; thereafter locking the transaction initiated by said one of said other unaware applications; and creating cache entries including after images for all items of interest affected by the update.

11. A data-sharing method wherein a non-cooperative DBMS of a primary computer system participates in unaware applications and has a cache, respective lock structures, database log files and database data files responsive to data requests generated by the unaware applications, said method comprising the steps of:

(a) nonintrusively monitoring data written to said database log files and said database data files and communicating information as to data written to said files to a secondary DBMS running on a potentially different computer and having a secondary cache and secondary lock requests and responsive to data requests by other unaware applications; and (b) processing data in said secondary DBMS between said other unaware applications and with said secondary cache and said secondary lock requests while reading data from said non-cooperative DBMS data files without interrupting update or retrieval activities of said non-cooperative DBMS and while isolating said non-cooperative DBMS from said other applications, thereby enabling said other unaware applications to access the data maintained by said non-cooperative DBMS; said primary computer system having a controller, said method further comprising the step of speeding a response time of said non-cooperative DBMS and reducing an I/O load on said controller by intercepting and eliminating the physical write operations directed to a database of the non-cooperative DBMS, and utilizing said controller to intercept log writes to automatically trigger writes to a disk of the non-cooperative DBMS, and for directly responding to read requests relying on data cached in memory of said non-cooperative DBMS.

12. A data-sharing method wherein a non-cooperative DBMS of a primary computer system participates in unaware applications and has a cache, respective lock structures, database log files and database data files responsive to data requests generated by the unaware applications, said method comprising the steps of:

(a) nonintrusively monitoring data written to said database log files and said database data files and communicating information as to data written to said files to a secondary DBMS running on a potentially different computer and having a secondary cache and secondary lock requests and responsive to data requests by other unaware applications;

(b) processing data in said secondary DBMS between said other unaware applications and with said secondary cache and said secondary lock requests while reading data from said non-cooperative DBMS data files without interrupting update or retrieval activities of said non-cooperative DBMS and while isolating said non-cooperative DBMS from said other applications, thereby enabling said other unaware applications to access the data maintained by said non-cooperative DBMS; and at least one of said DBMSs being provided with a time function keeping a transaction time for an entire duration of each transaction and creating an appearance of a transaction occurring at a single point in time, thereby supporting true repeatable read and serializable transactions, and wherein, for each transaction requiring a "repeatable read" or "serializable" isolation level, a transaction snapshot entry is created which includes a transaction identifier identifying the transaction, a log position identifier containing a last position in the log that has been read at the instant the transaction is initiated, a time stamp serving for date-related functions required by the logic for the transaction and a process identifier pointing to a process which issued the transaction.

13. A computer system comprised of a secondary DBMS, a secondary cache and secondary lock structures and connectable for data sharing with a non-cooperative DBMS of a primary computer which participates in unaware, applications and has a cache, respective lock structures, database log files and database data files responsive to data requests generated by the unaware applications, said computer system having a listener connected to said non-cooperative DBMS for:

(a) nonintrusively monitoring data written to said database log files and communicating information as to data written to said files to said secondary DBMS of said computer system, said computer system being responsive to data requests by other unaware applications; and (b) processing data in said secondary DBMS between said other unaware applications and with said secondary cache and said secondary lock requests while reading data from said non-cooperative DBMS with said secondary DBMS without interrupting update or retrieval activities of said non-cooperative DBMS and while isolating said non-cooperative DBMS from said other applications, thereby enabling said other unaware applications to access the data maintained by the non-cooperative DBMS.

14. The computer system defined in claim 13 wherein said listener, said secondary DBMS and said secondary cache are provided in a single hardware unit separately from a computer on which said other applications are run.

15. The computer system defined in claim 13 wherein said listener, said secondary DBMS and said secondary cache are provided in a computer in which said other applications are run.

16. A computer system comprised of a secondary DBMS, a secondary cache and secondary lock structures and connectable for data sharing with a non-cooperative DBMS of a primary computer which participates in unaware applications and has a cache, respective lock structures, database log files and database data files responsive to data requests generated by the unaware applications, said computer system having a listener connected to said non-cooperative DBMS for:

(a) nonintrusively monitoring data written to said database log files and communicating information as to data written to said files to said secondary DBMS of said computer system, said computer system being responsive to data requests by other unaware applications: and (b) processing data in said secondary DBMS between said other unaware applications and with said secondary cache and said secondary lock requests while reading data from said non-cooperative DBMS with said secondary DBMS without interrupting update or retrieval activities of said non-cooperative DBMS and while isolating said non-cooperative DBMS from said other applications, thereby enabling said other unaware applications to access the data maintained by the non-cooperative DBMS said listener being connected to intercepting data written by said primary computer to said non-cooperative DBMS and is programmed to parse the intercepted data nonintrusively with respect to said primary computer and utilize the parsed intercepted data to establish said secondary cache and secondary lock requests shielding unaware applications executed in said computer system from inconsistent data of said primary computer.

17. The computer system defined in claim 16 wherein said secondary cache is provided in a memory with a storage capacity corresponding to the entire database of the non-cooperative DBMS.

18. A computer system comprised of a secondary DBMS, a secondary cache and secondary lock structures and connectable for data sharing with a non-cooperative DBMS of a primary computer which participates in unaware applications and has a cache, respective lock structures, database log files and database data files responsive to data requests generated by the unaware applications, said computer system having a listener connected to said non-cooperative DBMS for:

(a) nonintrusively monitoring data written to said database log files and communicating information as to data written to said files to said secondary DBMS of said computer system, said computer system being responsive to data requests by other unaware applications; and (b) processing data in said secondary DBMS between said other unaware applications and with said secondary cache and said secondary lock requests while reading data from said non-cooperative DBMS with said secondary DBMS without interrupting update or retrieval activities of said non-cooperative DBMS and while isolating said non-cooperative DBMS from said other applications, thereby enabling said other unaware applications to access the data maintained by the non-cooperative DBMS, said listener, said secondary DBMS and said secondary cache being provided in a single hardware unit separately from a computer on which said other applications are run said listener and said secondary DBMS being combined with a storage controller responsive to SQL select and other data manipulation read commands retrieving data of said non-cooperative DBMS.

19. The computer system defined in claim 18 wherein at least one of said computers has a multiplicity of dedicated CPUs for executing the SQL select and other data manipulation read commands in parallel on different parts of the secondary cache.

* * * * *